United States Patent
Gohng et al.

(10) Patent No.: US 8,809,716 B2
(45) Date of Patent: Aug. 19, 2014

(54) HAPTIC STEERING WHEEL SWITCH APPARATUS AND HAPTIC STEERING WHEEL SWTICH SYSTEM INCLUDING THE SAME

(75) Inventors: Jun-Ho Gohng, Gyeonggi-do (KR); Lee-Hwa Jung, Gyeonggi-do (KR); Dae Woo Kwon, Gyeonggi-do (KR); Jin Young Lee, Gyeonggi-do (KR)

(73) Assignee: Daesung Electric Co., Ltd., Gyeonggi-Do (KR)

( * ) Notice: Subject to any disclaimer, the term of this patent is extended or adjusted under 35 U.S.C. 154(b) by 290 days.

(21) Appl. No.: 13/334,145

(22) Filed: Dec. 22, 2011

(65) Prior Publication Data
US 2012/0267221 A1 Oct. 25, 2012

(30) Foreign Application Priority Data

Apr. 25, 2011 (KR) .................... 10-2011-0038250
Apr. 25, 2011 (KR) .................... 10-2011-0038251

(51) Int. Cl.
*H01H 3/08* (2006.01)
*H01H 19/00* (2006.01)

(52) U.S. Cl.
USPC ..................... 200/336; 200/11 TW

(58) Field of Classification Search
USPC .......... 200/336, 61.54–61.57, 310, 311, 317;
362/36, 44, 100; 74/484 R, 552;
280/315, 333
See application file for complete search history.

(56) References Cited

U.S. PATENT DOCUMENTS

| | | | |
|---|---|---|---|
| 5,855,144 A | 1/1999 | Parada | |
| 6,636,197 B1 | 10/2003 | Goldenberg et al. | |
| 6,703,999 B1 | 3/2004 | Iwanami et al. | |
| 6,852,936 B2 | 2/2005 | Hayashi et al. | |
| 6,876,313 B2* | 4/2005 | Hsiung et al. | 341/35 |
| 7,439,459 B2 | 10/2008 | Hyun et al. | |
| 7,441,800 B2 | 10/2008 | Weber et al. | |
| 7,680,574 B2 | 3/2010 | Berg et al. | |

(Continued)

FOREIGN PATENT DOCUMENTS

| | | |
|---|---|---|
| EP | 1575017 A1 | 9/2005 |
| EP | 1 769 963 A2 | 4/2007 |

(Continued)

OTHER PUBLICATIONS

English-language Abstract of Korean Patent Document No. 1997-0010790 dated Jul. 24, 1997, 1 page.

(Continued)

*Primary Examiner* — Renee S Luebke
*Assistant Examiner* — Harshad Patel
(74) *Attorney, Agent, or Firm* — Rabin & Berdo, P.C.

(57) ABSTRACT

The present invention provides a haptic steering wheel switch apparatus including: a haptic wheel housing unit configured to be disposed on a vehicle steering wheel; a circuit board unit configured to be disposed inside the haptic wheel housing unit; and a haptic wheel device including a haptic wheel device actuator configured to establish an electrical connection with the circuit board unit and including a haptic shaft, a haptic knob connected with the haptic shaft and exposedly disposed in the haptic wheel housing unit, and a haptic wheel device sensing unit configured to detect the rotating state of the haptic shaft, wherein the haptic wheel device is disposed on a front or rear side of the vehicle steering wheel, and a haptic steering wheel switch system including the same.

29 Claims, 22 Drawing Sheets

(56) References Cited

U.S. PATENT DOCUMENTS

| | | | |
|---|---|---|---|
| 2005/0018172 A1* | 1/2005 | Gelfond et al. | 356/51 |
| 2006/0155441 A1 | 7/2006 | Berg et al. | |
| 2006/0271261 A1* | 11/2006 | Flores et al. | 701/49 |
| 2010/0200375 A1* | 8/2010 | Han et al. | 200/61.54 |
| 2012/0267222 A1* | 10/2012 | Gohng et al. | 200/61.54 |
| 2013/0038431 A1 | 2/2013 | Springer et al. | |

FOREIGN PATENT DOCUMENTS

| | | |
|---|---|---|
| EP | 2447971 A1 | 5/2012 |
| JP | 61-003637 U | 1/1986 |
| JP | 2-19656 | 2/1990 |
| JP | 9-161612 | 6/1997 |
| JP | 10-334771 A | 12/1998 |
| JP | 10-340152 | 12/1998 |
| JP | 2001-345031 | 12/2001 |
| JP | 2003-22137 | 1/2003 |
| JP | 2003-050639 | 2/2003 |
| JP | 2003-063326 | 3/2003 |
| JP | 2003-327059 | 11/2003 |
| JP | 2004-146090 | 5/2004 |
| JP | 2004-185976 | 7/2004 |
| JP | 2004-228022 | 8/2004 |
| JP | 2004-537452 | 12/2004 |
| JP | 2007-234482 | 9/2007 |
| JP | 2007-326490 A | 12/2007 |
| JP | 2008-047370 | 2/2008 |
| JP | 2008-170766 | 7/2008 |
| JP | 2008-233344 | 10/2008 |
| JP | 2009-519855 | 5/2009 |
| JP | 2010-010023 A | 1/2010 |
| JP | 2010-244899 | 10/2010 |
| JP | 2010-540320 | 12/2010 |
| JP | 2012-230901 A | 11/2012 |
| KR | 1997-0040790 A | 7/1997 |
| KR | 10-2004-0106162 | 12/2004 |
| KR | 2007-0026259 A | 3/2007 |
| KR | 10-0877067 | 12/2008 |
| KR | 10-2009-0084945 | 8/2009 |
| KR | 10-2009-128163 | 12/2009 |
| WO | WO 03/012557 A2 | 2/2003 |
| WO | WO-2006-013470 A2 | 2/2006 |
| WO | WO-2010/150933 A1 | 12/2010 |

OTHER PUBLICATIONS

English-language abstract of Korean patent document No. 2007-0026259, dated Mar. 8, 2007, 1 page.

* cited by examiner

HAPTIC STEERING WHEEL SWITCH APPARATUS AND HAPTIC STEERING WHEEL SWTICH SYSTEM INCLUDING THE SAME

CROSS-REFERENCE TO RELATED APPLICATIONS

This application claims the benefit of Korean Patent Application No. 10-2011-0038250, filed on Apr. 25, 2011 and Korean Patent Application No. 10-2011-0038251, filed on Apr. 25, 2011 in the Korean Intellectual Property Office, which is incorporated herein by reference in its entirety. The present application is related to a patent application which has been filed by the same Applicant, i.e., U.S. Utility patent application entitled "HAPTIC STEERING WHEEL SWITCH DEVICE AND HAPTIC STEERING WHEEL SWITCH SYSTEM INCLUDING THE SAME," filed on Mar. 25, 2010, and bearing a Ser. No. 12/680,198.

BACKGROUND OF THE INVENTION

1. Field of the Invention

The present invention relates to a switch device, and more particularly to such a switch device having a simple structure, which achieves a smooth operation upon the steering of the wheel by a driver and allows the driver to make a quick perception.

2. Background of the Related Art

A switch device is used as a device for selection and manipulation for apparatuses such as vehicles, machine tools, terminals, multimedia devices, game machines, and the like. Nevertheless, a variety of researches and developments are also in progress on a switch device for diverse functional selections of the apparatuses. Examples of such a switch device include a rotary switch enabling axial rotation besides a button switch of a simple push switch type. In addition, a variety of researches and productions are performed on a rotary switch having diverse modified structures.

In the meantime, since a target manipulated by a switch device has complicated and various functions, the switch device requires a function for selecting a combined hierarchical operation and enables a hierarchical operating function through a stepwise operation. Such a conventional switch device, however, entails an drawback in that it merely has a construction in which a light source for irradiating an illuminating light is disposed at an icon arranged on a switch knob of the switch device and in that since it does not perform active display functions corresponding to various operating modes, a user suffers from an inconvenience of having to watch a separate display screen. That is, the conventional switch device involves a problem in that since the user has to simultaneously watch the switch knob of the switch device and the display screen to manipulate the switch device, manipulation of the switch device is inconvenient or a driver's driving attention is diverted in case of a switch device mounted at a vehicle, thereby decreasing the driving safety of the vehicle. In addition, another conventional switch device has an electrostatic capacity type switch structure in which the display device and the switch device are integrated with each other. However, a conventional touch switch has a weak responsiveness to manipulation thereof, and thus a user does not feel a direct manipulation feeling.

SUMMARY OF THE INVENTION

Accordingly, it is an object of the present invention to provide a haptic steering wheel switch apparatus with a simple structure, which is mounted on a steering wheel of a vehicle, has a compact size, can remarkably reduce the manufacturing cost, and improves the manipulating property thereof, and a haptic steering wheel switch system including the same.

To achieve the above object, in one aspect, the present invention provides a haptic steering wheel switch apparatus, including: a haptic wheel housing unit configured to be disposed on a vehicle steering wheel; a circuit board unit configured to be disposed inside the haptic wheel housing unit; and a haptic wheel device including a haptic wheel device actuator configured to establish an electrical connection with the circuit board unit and including a haptic shaft, a haptic knob connected with the haptic shaft and exposedly disposed in the haptic wheel housing unit, and a haptic wheel device sensing unit configured to detect the rotating state of the haptic shaft, wherein the haptic wheel device is disposed on a front or rear side of the vehicle steering wheel.

In the haptic steering wheel switch apparatus, the haptic knob may achieve a rotary operation on plane on which the vehicle steering wheel is arranged and the haptic wheel device actuator is moved vertically in a longitudinal direction of the haptic shaft.

In the haptic steering wheel switch apparatus, the haptic knob may be disposed on a front side of the vehicle steering wheel, and a rotation central axis of the haptic shaft intersects intersects a plane on which the vehicle steering wheel is rotated.

In the haptic steering wheel switch apparatus, the haptic shaft of the haptic wheel device actuator may include a first end and a second end respectively formed at both ends thereof.

In the haptic steering wheel switch apparatus, the haptic knob may be connected with the first end of the haptic shaft and the haptic wheel device sensing unit is connected with the second end of the haptic shaft.

In the haptic steering wheel switch apparatus, a shaft knob holder may be disposed between the haptic knob and the first end of the haptic shaft to prevent the relative rotation between the haptic knob and the first end.

In the haptic steering wheel switch apparatus, a shaft sensing holder may be disposed between the haptic wheel device sensing unit and the second end of the haptic shaft to prevent the relative rotation between the haptic wheel device sensing unit and the second end.

In the haptic steering wheel switch apparatus, the haptic wheel device sensing unit may comprise a device sensing body part connected with the haptic wheel device actuator, and a device detecting sensor part configured to detect the rotation state of the device sensing body part, wherein the device sensing body part comprises: a device sensing main pulley connected with the shaft sensing holder in such a fashion that the relative rotation between the device sensing main pulley and the shaft sensing holder 314 is restricted; a device sensing sub-pulley connected with the device sensing main pulley in such a fashion as to be spaced apart from the device sensing main pulley; a device sensing belt configured to interconnect the device sensing main pulley and the device sensing sub-pulley; and a device slot connected to the device sensing sub-pulley and configured to be rotated together with the device sensing sub-pulley when the device sensing sub-pulley is rotated, the device slot being rotatably disposed at a position corresponding to the device detecting sensor part.

In the haptic steering wheel switch apparatus, a rotation ratio of the device sensing main pulley to the device sensing sub-pulley may be more than 1.

The haptic steering wheel switch apparatus may further comprise a push switch unit configured to generate a switching signal when the haptic knob is moved vertically in the longitudinal direction of the haptic shaft.

In the haptic steering wheel switch apparatus, the push switch unit may comprise: a push switch disposed on the circuit board unit; and a push switch operating part configured to be moved vertically together with the haptic wheel device actuator.

In the haptic steering wheel switch apparatus, the push switch may be provided in plural numbers.

In the haptic steering wheel switch apparatus, the haptic wheel device sensing unit may be moved vertically together with the haptic wheel device actuator.

In the haptic steering wheel switch apparatus, the haptic knob may be formed of a light-transmitting material, the circuit board unit comprises a knob board configured to allow the first end of the haptic shaft to pass therethrough and serve as an end of the haptic wheel device actuator, and a haptic knob light source unit is mounted on the knob board to output light.

In the haptic steering wheel switch apparatus, a button switch unit may be disposed at an outside of the haptic knob so that it is operated vertically independently of the haptic knob.

In the haptic steering wheel switch apparatus, the button switch unit may comprise: a button knob configured to be disposed on the outside of the haptic knob in such a fashion as to be exposed at one surface thereof to the outside of the haptic wheel housing unit; a button guide configured to be disposed at one end thereof within the button knob and disposed at the other end thereof within the haptic wheel housing unit toward the circuit board unit; a button guide holder configured to be attached to the button guide and disposed in the haptic wheel housing unit in a vertically stable movable manner together with the button guide; and a button switch configured to be disposed on one surface of the circuit board unit in such a fashion as to be brought into close contact with the button guide holder.

In the haptic steering wheel switch apparatus, the button guide holder may comprise a button guide holder stopper formed on one side thereof, and the haptic wheel housing unit comprises a wheel housing body stopper formed thereon in such a fashion as to come into close contact with the button guide holder stopper to correspond to the button guide holder stopper so that the button guide holder is prevented from being separated and escaping from the wheel housing body of the haptic wheel housing unit.

In the haptic steering wheel switch apparatus, the button guide holder may comprise a button guide holder operating part configured to operate the button switch.

In the haptic steering wheel switch apparatus, the button switch unit may further comprise a button light source unit, and the button guide is formed of a light guide material.

In the haptic steering wheel switch apparatus, the button guide holder operating part may comprise a button guide holder operating part seating face formed on one surface thereof so that it comes close contact with the button guide to support the button guide.

In the haptic steering wheel switch apparatus, a button color filter may be disposed between the button guide and the button knob to transmit only light having a predetermined frequency band.

In the haptic steering wheel switch apparatus, the haptic knob may comprise a haptic knob dimple formed in a concave shape on one surface thereof, the haptic knob dimple having a structure in which a dimple depth formed in a direction perpendicular to the rotation center of the haptic knob is gradually decreased as it goes toward a radial direction from the center of the haptic knob.

In the haptic steering wheel switch apparatus, the haptic knob may comprise a haptic knob grip formed protrudingly on one surface thereof.

In the haptic steering wheel switch apparatus, the haptic knob may comprise a haptic knob contact surface formed in a dual injection manner on a top thereof to increase a contact frictional force between the driver's finger and the haptic knob.

In the haptic steering wheel switch apparatus, the rotation central axis of the haptic shaft may be disposed in parallel with a plane on which the vehicle steering wheel is rotated.

In the haptic steering wheel switch apparatus, the haptic knob may be disposed on the rear side of the vehicle steering wheel in such a fashion as to be spaced apart within a predetermined distance from a wheel rim of the vehicle steering wheel.

In the haptic steering wheel switch apparatus, the predetermined distance may be selected within a range of enabling the manipulation of the haptic knob while the driver grips the wheel rim of the vehicle steering wheel.

In the haptic steering wheel switch apparatus, a haptic transmitting unit may be disposed between the haptic knob and the haptic wheel device to transmit the rotation state between the haptic knob and the haptic wheel device.

The haptic steering wheel switch apparatus, may further comprise a steering wheel light source unit disposed in the haptic wheel housing unit and configured to establish an electrical connection with the circuit board unit so as to output predetermined light in response to the operation of the haptic knob.

The haptic steering wheel switch apparatus may further comprise a wheel rim light source output unit disposed in the wheel rim of the vehicle steering wheel and configured to receive light entering from the steering wheel light source unit and output the received light to the outside.

The haptic steering wheel switch apparatus may further comprise a steering wheel light source unit disposed in the haptic wheel housing unit and configured to establish an electrical connection with the circuit board unit so as to output predetermined light in response to an electrical signal applied from an external vehicle control device.

In another aspect, the present invention provides a haptic steering wheel switch system including: a haptic steering wheel switch apparatus which comprises: a haptic wheel housing unit configured to be disposed on a vehicle steering wheel; a circuit board unit configured to be disposed inside the haptic wheel housing unit; and a haptic wheel device including a haptic wheel device actuator configured to establish an electrical connection with the circuit board unit and including a haptic shaft, a haptic knob connected with the haptic shaft and exposedly disposed in the haptic wheel housing unit, and a haptic wheel device sensing unit configured to detect the rotating state of the haptic shaft, wherein the haptic wheel device is disposed on a front or rear side of the vehicle steering wheel, a control unit configured to establish an electrical connection with the haptic steering wheel switch apparatus; and a storage unit configured to to establish an electrical connection with the control unit and store predetermined data for a predetermined operating mode.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Now, a haptic steering wheel switch apparatus and a haptic steering wheel switch system including the same according to the preferred embodiments of the present invention will be described hereinafter in more detail with reference to the accompanying drawings.

The haptic steering wheel switch apparatus 10 according to one embodiment of the present invention is mounted on a steering wheel 2 of a vehicle so that a driver manipulates the switch device more easily, a haptic sensation is applied to the driver, and a physical warning function is executed, thereby improving the driver's attention and convenience in use.

The steering wheel 2 of a vehicle can include a wheel rim 2A and a wheel hub 2B and 2C. The wheel rim 2A is connected with a wheel hub body 2B through a wheel spoke 2C. In this embodiment, although the wheel rim is constructed in a ring type, it may be constructed in various manners within a range of enabling the driver to form a contact region for steering the wheel, but not limited thereto.

Figure 1:
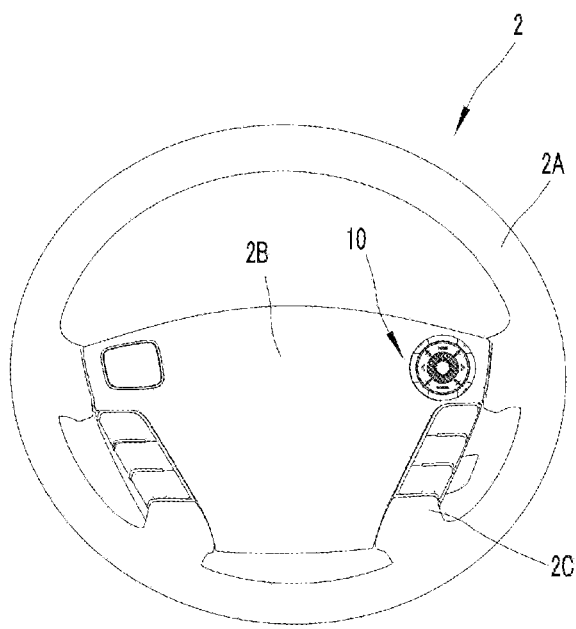
FIG. 1 is a schematic top plan view illustrating a steering wheel on which a haptic steering wheel switch apparatus according to one embodiment of the present invention is mounted.
Figure 2:
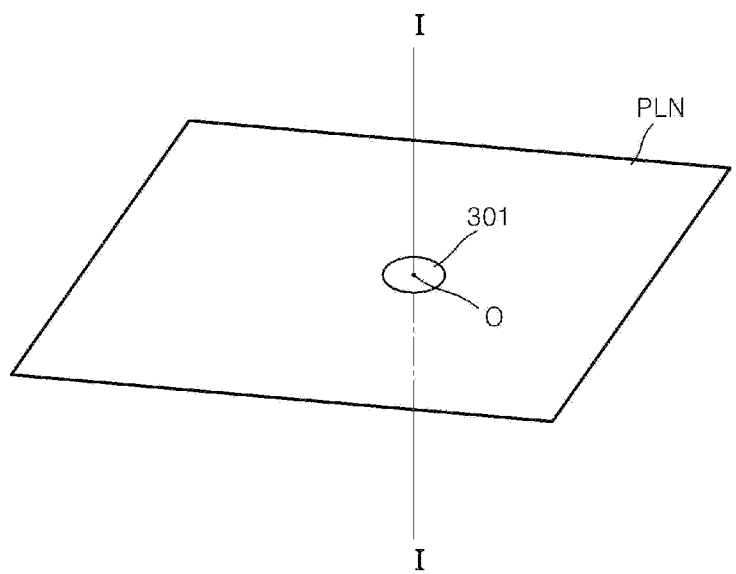
FIG. 2 is a schematic diagrammatic view illustrating a state in which a haptic steering wheel switch apparatus according to one embodiment of the present invention is mounted on a front side of a vehicle steering wheel.
Figure 3:
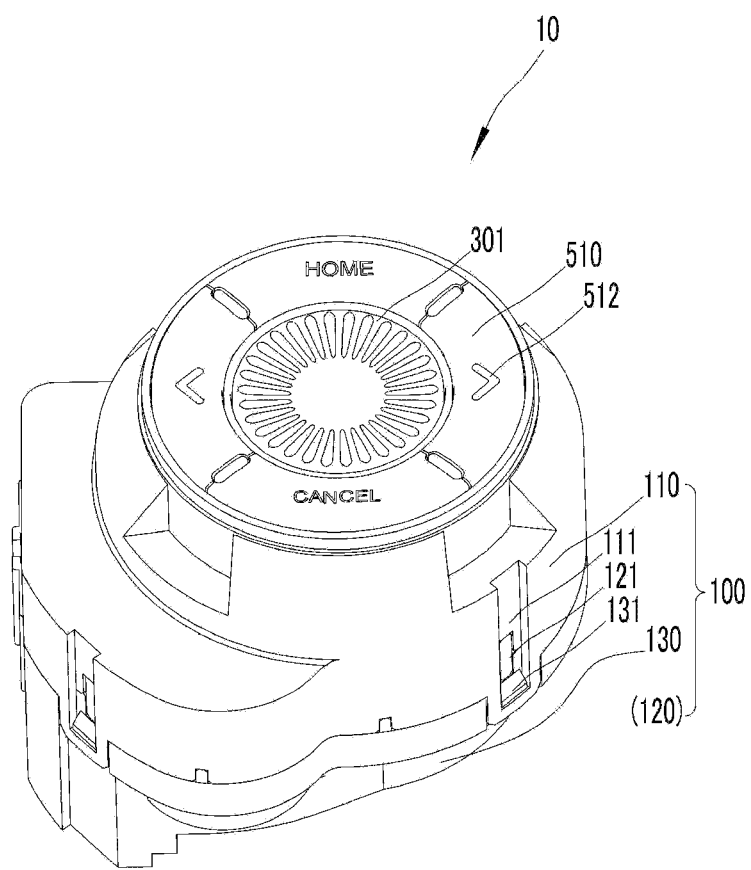
FIG. 3 is a schematic perspective view illustrating a haptic steering wheel switch apparatus according to one embodiment of the present invention.
Figure 4:
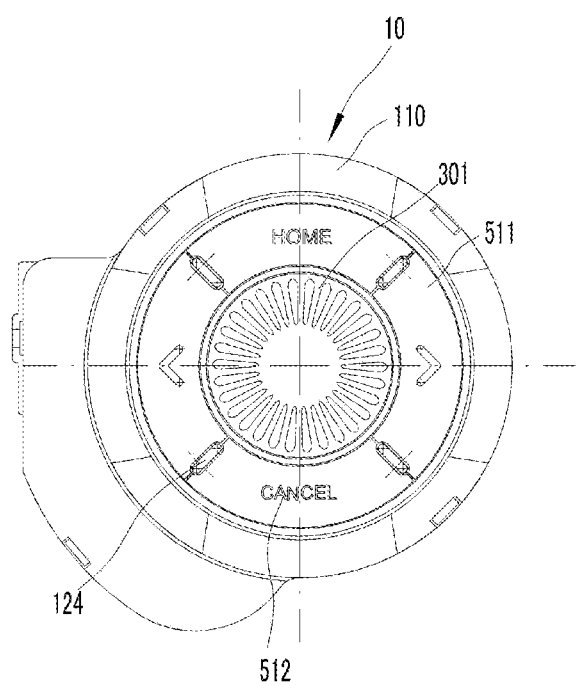
FIG. 4 is a schematic top plan view illustrating a haptic steering wheel switch apparatus according to one embodiment of the present invention.
Figure 18:
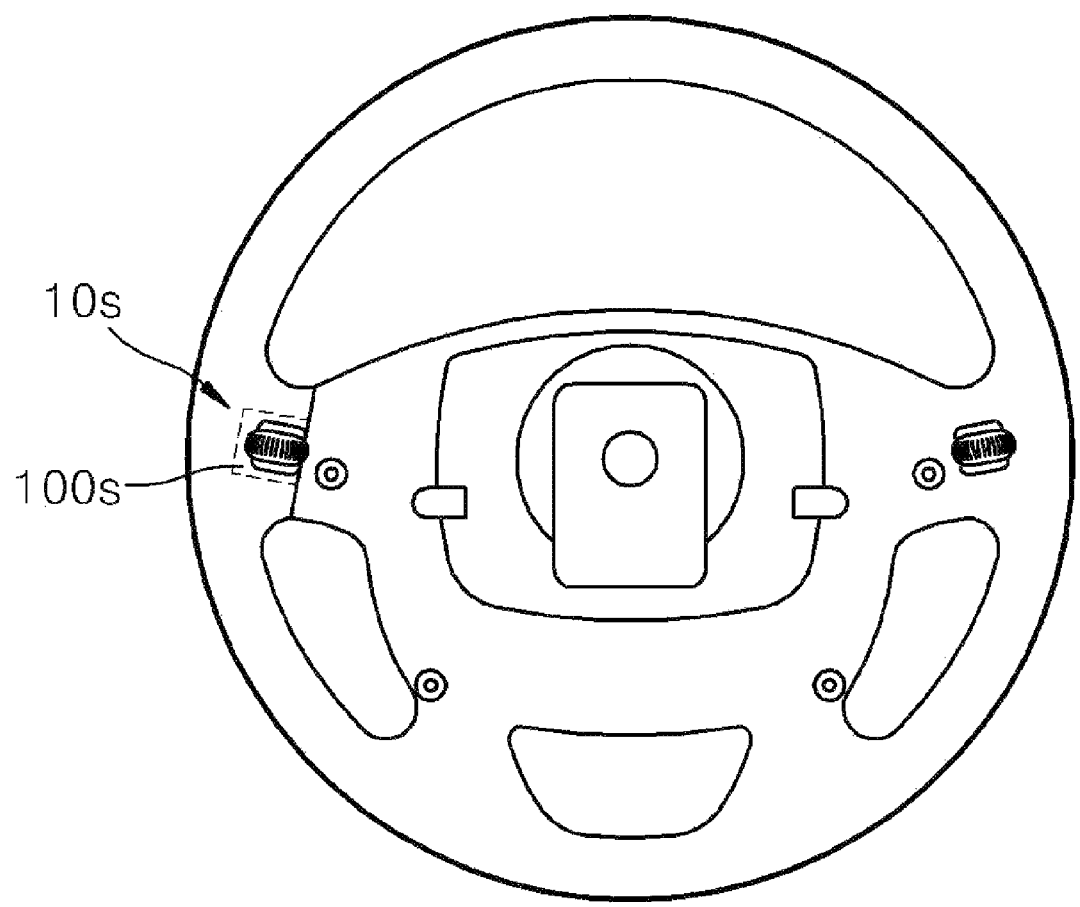
FIG. 18 is a schematic rear view illustrating a mounted state of a haptic steering wheel switch apparatus according to another embodiment of the present invention.
Figure 19:
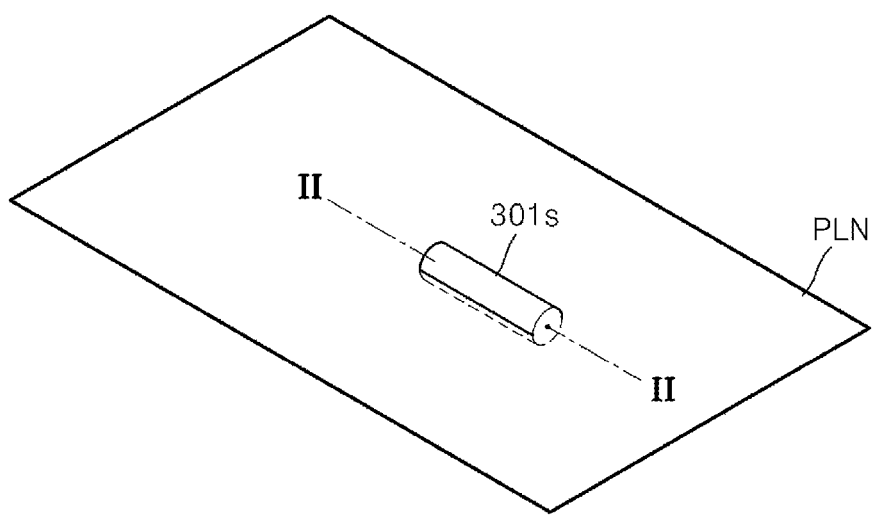
FIG. 19 is a schematic diagrammatic view illustrating a state in which a haptic steering wheel switch apparatus according to another embodiment of the present invention is mounted on a rear side of a vehicle steering wheel.
Figure 20:
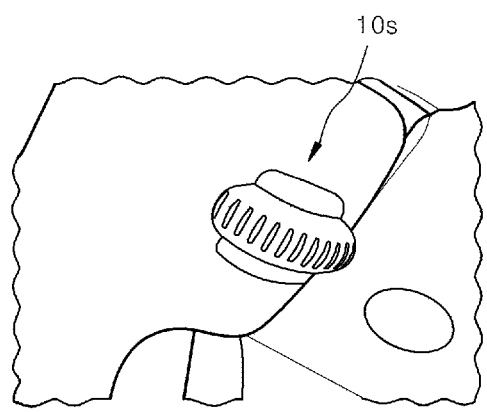
FIG. 20 is a partial enlarged rear view illustrating a haptic steering wheel switch apparatus according to another embodiment of the present invention is mounted on a rear side of a vehicle steering wheel.

The haptic steering wheel switch apparatus 10 according to the present invention is disposed on a front or rear side of the vehicle steering wheel. That is, the haptic steering wheel switch apparatus 10 is disposed on the front side of the vehicle steering wheel 2 as shown in FIGS. 1 and 2, or is disposed on the rear side of the vehicle steering wheel 2 as shown in FIGS. 18 and 19. First, in the former structure, the haptic steering wheel switch apparatus 10 is disposed on the wheel hub body 2B, but it may be disposed in various manners within a range of implementing a thumb-wheel type structure to enable the driver to manipulate the switch device simply and easily. In the case where the haptic steering wheel switch apparatus 10 is disposed on the front side of the vehicle steering wheel 2, it has a structure in which a longitudinal direction of a haptic shaft, which will be described later, of the switch device 10, i.e., ultimately a rotation central axis I-I about which a haptic knob is rotated intersects a plane PLN on which the vehicle steering wheel 2 is arranged, so that the driver can perform a rotation operation of the switch device smoothly using his or her thumb.

More specifically, the haptic steering wheel switch apparatus 10 includes a haptic wheel housing unit 100, a circuit board unit 200, and a haptic wheel device 300. The circuit board unit 200 and the haptic wheel device 300 is stably mounted in the haptic wheel housing unit 100.

The haptic wheel housing unit 100 is stably and securely disposed on the vehicle steering wheel 2, more specifically on the wheel hub body 2B in this embodiment.

The haptic wheel housing unit 10 includes a wheel housing cover 110, a wheel housing body 120, and a wheel housing base 130. The wheel housing cover 110, the wheel housing body 120, and the wheel housing base 130 are engaged with each other to define an inner space to accommodate other constituent elements.

The wheel housing cover 110 has a through-hole 113 formed therein so that the haptic wheel device 300, which will be described later, is penetratingly disposed in the wheel housing cover 110 through the through-hole 113. The wheel housing cover 110 includes a wheel housing cover mounting part 111 formed at one side end thereof. The wheel housing cover mounting part 111 has a structure in which it is engaged with the wheel housing body 120 which will be described later and/or the wheel housing base 130.

Button knob guides 115 are formed on the inner periphery of the through-hole 113 of the wheel housing cover 110 so that a button knob 510 of a button switch unit 500, which will be described later can vertically move stably.

The wheel housing body 120 is disposed so as to abut against the wheel housing cover 110, and includes a through-hole 123. The through-hole 123 is connected with the through-hole 113 to establish a stable connection of the haptic wheel device 300. The wheel housing body 120 includes a wheel housing body mounting part 121 formed on an outside thereof so that the wheel housing body mounting part 121 is engaged with the wheel housing cover mounting part 111 to ensure a stable engagement between the wheel housing cover 110 and the wheel housing body 120.

The wheel housing body 120 includes a barrier rib 124 formed on an upper portion thereof in such a fashion as to extend radially from the outer circumference of the through-hole 123. The barrier rib 124 serves to guide a stable vertical movement of the button knob 510, which will be described later. The barrier rib 124 may be formed in plural numbers. A button knob through-hole 125 is formed between two adjacent barrier ribs 124 so that at least partial constituent elements of the button switch unit 500 can be passed through the button knob through-hole 125. A button holder guide 126 is formed on an inner surface of the button knob through-hole 125 so as to guide a stable vertical movement of the button guide holder 540 which will be described later and prevent an erroneous assembly of the button guide holder 540 and the wheel housing body 120. In addition, a wheel housing body stopper 127 is formed on an inner surface of the button knob through-hole 125 so that the button knob 510 can be prevented from being undesirably separated and escaping from the button knob through-hole 125 by a vertical restoring force thereof through the button switch 550, which will be described later, and the like.

The wheel housing base 130 is disposed to confront the wheel housing cover 110 with the wheel housing body 120 interposed between the wheel housing cover 110 and the wheel housing base 130. The wheel housing base 130 includes wheel housing base mounting part 131 formed on an outer circumference thereof so that it is engaged with the wheel housing cover mounting part 111 to ensure a stable engagement between the wheel housing cover 110 and the wheel housing base 130.

A wheel housing base connector 132 is disposed on the wheel housing base 130 and a board connector pin 211 connected to the circuit board unit 200 which will be described later is disposed in the wheel housing base connector 132 to establish an electrical connection with an external electrical device. Herein, although an element denoted by a reference numeral 200 is named a circuit board unit, it may be implemented as a typical printed circuit board or an insert injection structure within a rage of forming a circuit wiring. In addition, the circuit board unit 200 may be may be constructed in various manners within a range of achieving delivery of an electrical signal, such as being formed as a metal board for releasing heat generated from an LED, and the like to the outside.

The circuit board unit 200 is disposed inside the haptic wheel housing unit 100. The circuit board unit 200 may be formed as a single board, but in this embodiment, takes a structure having a plurality of boards. The printed circuit board 200 is electrically connected with another element, particularly the haptic wheel device 300 which will be described later so that delivery of an electrical signal that applies a rotating force to a haptic shaft of the haptic wheel device actuator 310 or senses the rotating state of the haptic shaft can be established.

The circuit board unit 200 includes a main board 210, a sensing board 220, a flexible board 230, and a knob board 240. The main board 210 is disposed between the wheel housing body 120 and the wheel housing base 130, and the connector pin 211 is disposed on the main board 210 to establish an electrical connection with an external electrical device. The main board 211 has a through-hole 213 formed at the center thereof so that another element, i.e., the haptic wheel device actuator 310 can be penetratingly disposed in the main board 211 through the through-hole 213.

An element of a haptic wheel device sensing unit 330 of the haptic wheel device 300, which will be described later, is disposed on the sensing board 220. The sensing board 220 is vertically disposed on the main board 210. This is an example of one embodiment of the present invention and the arrangement structure of the sensing board is not limited thereto, but various modifications including being integrated with the main board can be made to the sensing board. In this embodiment, the sensing board 220 is fixedly mounted on a fixture base 323 of a haptic wheel device fixture 320 of the haptic wheel device 300 to implement a structure of being vertically disposed on the main body 210.1

The flexible board 230 is connected at both ends to the main board 210 and the sensing board 220 which are vertically oriented with respect to each other, respectively, to establish a smooth electrical connection between the main board 210 and the sensing board 220. In this embodiment, although the main board 210 and the sensing board 220 are connected with each other through the flexible board 230, a structure may be implemented in which they are directly connected with each other.

The knob board 240 is disposed on a top of the haptic wheel device actuator 310 of the haptic wheel device 300, which will be described later. A haptic knob light source unit 340 is disposed on the knob board 240 so that a light output function through the haptic knob 301 can be performed by the haptic knob light source unit 340.

The haptic wheel device 300 is disposed in the haptic wheel housing unit 100. The haptic wheel device 300 includes a haptic wheel device actuator 310, a haptic wheel device fixture 320 and a haptic wheel device sensing unit 330. The haptic wheel device actuator 310 establishes an electrical connection with the circuit board unit 200 so that it receives an electrical signal from an internal/external control unit to generate a predetermined rotating force, impact force, or rotation restraining force and provide an inner force sense to a manipulator according to a scheme in which the electrical signal through the electrical connection is previously stored in a stored unit, in response to a state in which the manipulator turns or rotates the haptic knob, or in a certain predetermined and stored manner for a warning of a vehicle state. In this embodiment, the haptic wheel device actuator 310 is implemented as an electric motor. The haptic wheel device actuator 310 according to this embodiment is formed as a two-axis electric motor. The term "two-axis" refers to a structure in which a rotating shaft is connected to both ends of the haptic wheel device actuator. The haptic knob 301 and the haptic wheel device sensing unit 330 are connected to haptic shafts 311 and 313 of the haptic wheel device actuator 310 implemented as the two-axis electric motor, respectively. The haptic shafts 311 and 313 are disposed on both ends of the haptic wheel device actuator 310 and include a first end 311 and a second end 313. The first end 311 is connected to the haptic knob 301 and the second end 313 is connected to the haptic wheel device sensing unit 330, which will be described later.

The haptic wheel device actuator 310 is stably disposed in the haptic wheel housing unit 100 by means of the haptic wheel device fixture 320, and performs a stable vertical movement together with a push switch operating part 420 of a push switch unit 400, which will be described later. The haptic wheel device fixture 320 includes a fixture body 321 and a fixture base 323. The fixture body 321 has a through-hole 326 formed at an upper end of thereof and has a through-hole 324 formed at a lower end thereof. The haptic shafts 311 and 313 of the haptic wheel device actuator 310 constructed as the two-axis electric motor are penetratingly disposed in the upper and lower ends of the haptic wheel device actuator 310 through the fixture body through-hole 326 and the fixture base through-hole 324, respectively. A fixture mounting part is respectively disposed on the outer circumference of the fixture body 321 and the fixture base 323 and a fixture fastening member 328 such as a bolt is mounted on the fixture body 321 and the fixture base 323 through the fixture mounting parts so that the fixture body 321 and the fixture base 323 can be securely fastened to each other.

The fixture body 321 has a knob board seating part 327 formed on the upper end thereof so that the knob board 240 of the circuit board unit 200 can be seated on the knob board seating part 327 to achieve a stable fixing state. A fixture base sensing mounting part 325 is formed at one side of the fixture base 323 and achieves a stable mounting state of a rotatable sub-pulley shaft 336 of the haptic wheel device sensing unit 330

The haptic knob 301 is connected with the haptic shaft 311 and is exposedly disposed on one surface of the haptic wheel housing unit 100. The haptic knob 301 is connected with the haptic shaft 311 of the haptic wheel device actuator 310 and a shaft knob holder 312 can be disposed between the haptic knob 301 and the haptic shaft 311. The shaft knob holder 312 is interposed between the haptic knob 301 and the first end 311 of the haptic shafts 311 and 313 so that a undesired relative rotation between the haptic knob 301 and the first end of the haptic shafts 311 and 313 can be prevented through the shaft knob holder 312.

The shaft knob holder 312 and the first end 311 take a press-fit configuration. The outer circumference of the shaft knob holder 312 can have a chamfered polygonal structure in which the relative rotation between contact areas is prevented. In addition, the shaft knob holder 312a is not limited thereto, but may be may be constructed in various manners within a range of having a structure of preventing the relative rotation between the haptic knob and the haptic shaft of the haptic wheel device actuator, such as achieving the engagement state between the first end and the shaft knob holder through a fastening means such as a separate knob screw or the like.

The haptic knob 301 includes a haptic knob plate 301a and a haptic knob body 301b. The haptic knob body 301b has a recess 301c formed at a lower portion thereof so that the shaft knob holder 312 can be accommodated in the recess 301c. The haptic knob plate 301a is disposed on one surface of the haptic knob body 301b. The haptic knob body 301b and the haptic knob plate 301a may be integrally formed with each other. A haptic knob grip 301-2 is formed on one surface of the haptic knob plate 301a so that a user can perform a smooth rotation operation of the haptic knob 301, i.e., a smoothly rotary operation about the haptic shafts 31 and 313 of the haptic wheel device actuator 310 without any slipping.

Figure 6:
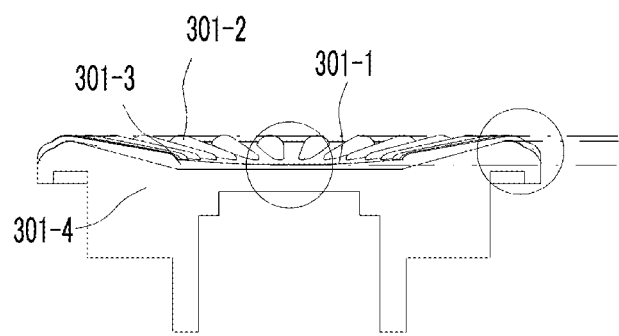
FIG. 6 is a schematic cross-sectional view illustrating a haptic knob of a haptic steering wheel switch apparatus according to one embodiment of the present invention.
Figure 7:
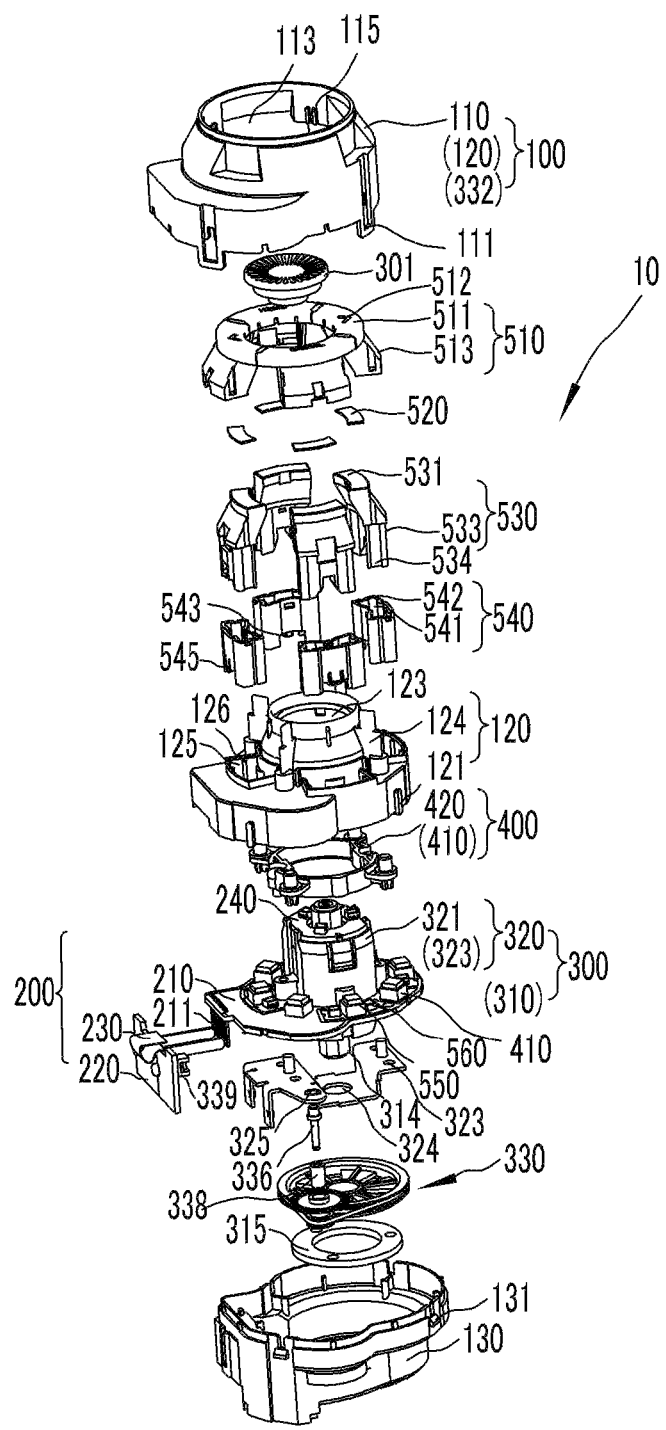
FIG. 7 is a schematic exploded perspective view illustrating a haptic steering wheel switch apparatus according to one embodiment of the present invention.
Figure 8:
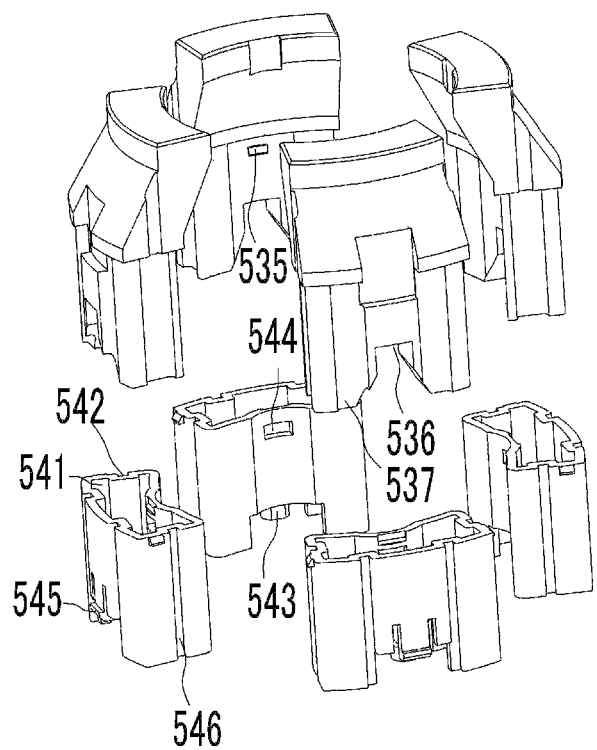
FIG. 8 is a schematic perspective view illustrating a button switch unit of a haptic steering wheel switch apparatus according to one embodiment of the present invention.
Figure 9:
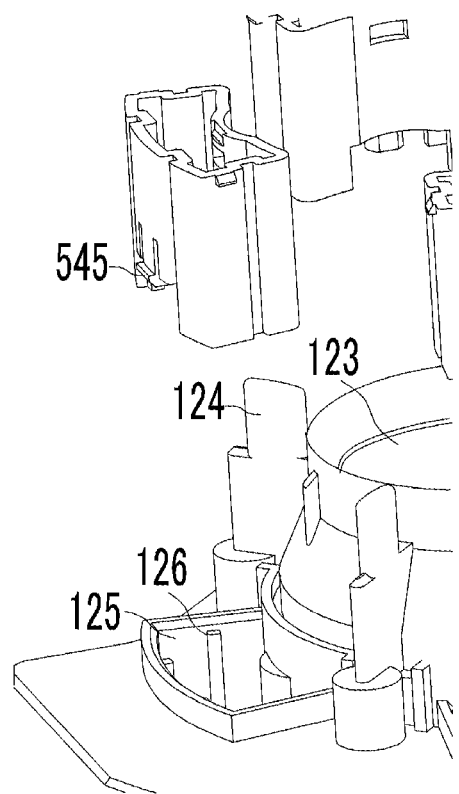
FIG. 9 is a schematic partial enlarged perspective view illustrating a button guide holder and a wheel housing body of a button switch unit of a haptic steering wheel switch apparatus according to one embodiment of the present invention.
Figure 28A:
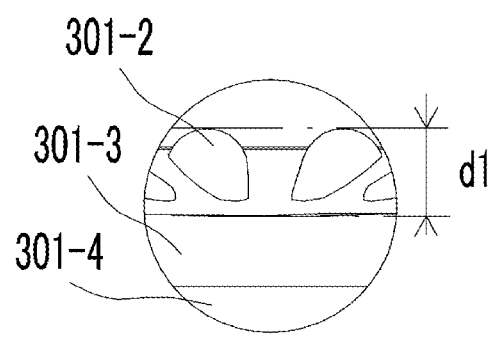
FIG. 28A and FIG. 28B are partially enlarged views of FIG. 6, which respectively show a depth of dimple formed at the central region of the haptic knob and a depth of dimple formed at the peripheral region of the haptic knob in more detail.
Figure 28B:
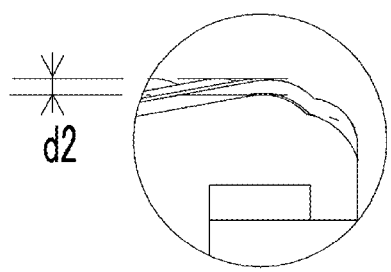

In addition, a haptic knob dimple 301-1 is formed on one surface of the haptic knob 301. The haptic knob dimple 301-1 is formed in a concave shape and takes a structure in which it is gradually increased in depth in the direction of the rotating shaft of the haptic knob 301 as it goes toward the central region thereof. That is, the haptic knob dimple 301-1 has a structure in which a dimple depth d1 (FIG. 28A) and d2 (FIG. 28B) formed in a direction perpendicular to the rotation center of the haptic knob 301 is gradually decreased as it goes toward a radial direction from the center of the haptic knob 301. That is, as shown in FIG. 6, FIG. 28A and FIG. 28B, the depth d1 of the haptic knob dimple 301-1 at the central region of the haptic knob 301 is set to be much larger than the depth d2 of the haptic knob dimple 301-1 at the peripheral region of the haptic knob 301 so that a driver can perform a smoother rotation operation of the haptic knob 301 using his or her finger, particularly his or her thumb.

By virtue of this structure, the driver can achieve an easy contact state between the finger and the haptic knob 301 to perform a smooth rotation operation of the haptic knob 301 when performing the rotation operation of the haptic knob 301 using his or her finger such as a thumb while manipulating the steering wheel 2. In other words, in the case where the haptic knob 301 has a structure in which the haptic knob dimple is not formed or is formed convexly in a hemispherical shape, it is difficult for a driver to perform a smooth rotation operation of the haptic knob 301 with him or her pressing the top surface of the haptic knob. On the contrary, in case of the haptic knob 301 formed with the haptic knob dimple as constructed above, the driver can perform a smoother rotation operation of the haptic knob 301 with him or her pressing the top surface of the haptic knob, particularly with him or her gripping the wheel rim of the steering wheel.

Besides, the haptic knob 301 may include an element for allowing a driver to perform a smooth rotation operation. That is, the haptic knob grip 301-2 is protrudingly formed on one surface of the haptic knob 301. By virtue of the construction of the haptic knob grip 301-2, when the driver performs a rotation operation of the haptic knob 310 using his or her finger such as a thumb, he or she can maintain a smooth rotation state without any slipping.

The haptic knob 301 may be formed as a single body, but may have a dual injection structure for allowing the driver to perform a smoother manipulation of the haptic switch device through the haptic knob 30, if necessary. That is, the haptic knob 301 may have a structure in which formed on surface of the haptic knob 301 is the haptic knob contact surface 301-3, which is made of a material having a low possibility of slipping at the time of contacting the skin of the driver's finger or the like, so as to increase a contact frictional force between the driver's finger and the haptic knob. For example, the haptic knob 301 may have a structure in which a portion denoted by a reference numeral 301-4 is primarily formed of a material such as polycarbonate (PC), and the haptic knob contact surface 301-3 formed by dual-injecting thermoplastic elastomer such as polyurethane or the like is additionally formed on one surface of the portion 301-4. In this case, when the driver manipulates the haptic knob, slipping due to sweat appearing on his or her finger can be prevented to perform a smooth rotation operation.

The haptic wheel device sensing unit 330 is connected with the second end 313 of the haptic shafts 311 and 313 to detect the rotation state of the haptic shaft, i.e., the operation state of the haptic wheel device actuator 310. The second end of the haptic wheel device actuator is connected with the haptic wheel device sensing unit 330. In order to prevent the relative rotation between the haptic wheel device actuator 310 and the haptic wheel device sensing unit 330, a shaft sensing holder 314 is disposed between the second end of the haptic shaft of the haptic wheel device actuator 310 and the haptic wheel device sensing unit 330. The shaft sensing holder 314 is an element corresponding to the shaft knob holder 312 used for connection between the first end and the haptic knob. The shape and structure of the shaft sensing holder 314 is the same as that of the shaft knob holder 312, and thus the detailed description thereof will be replaced with the aforementioned description of the shaft knob holder 312.

Figure 10:
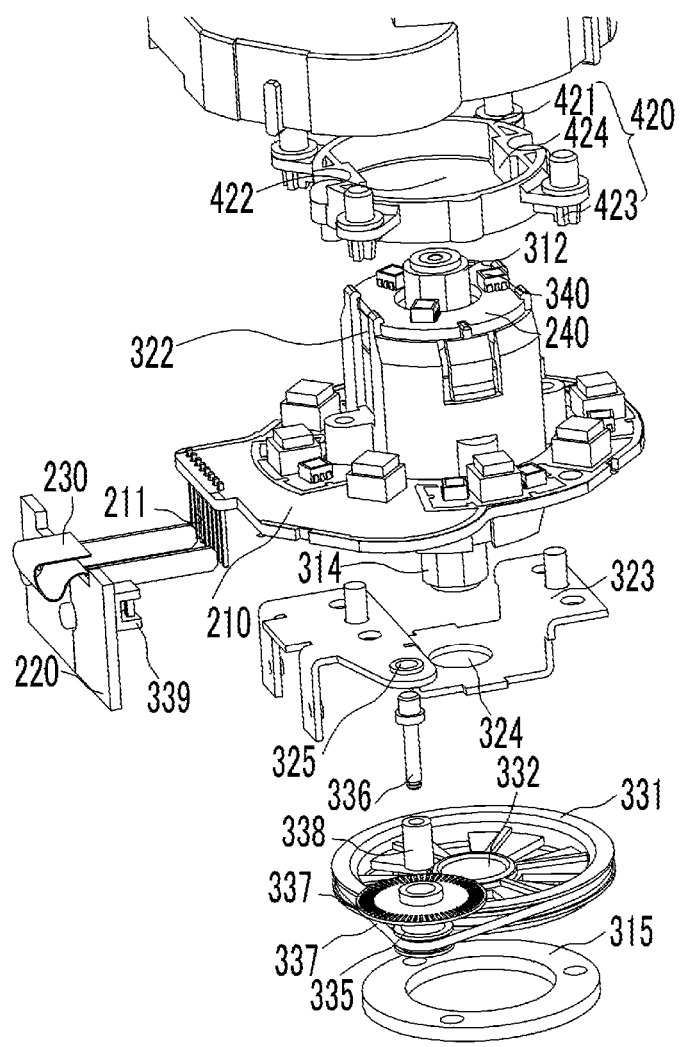
FIG. 10 is a schematic partial enlarged exploded perspective view illustrating a haptic steering wheel switch apparatus according to one embodiment of the present invention.
Figure 11:
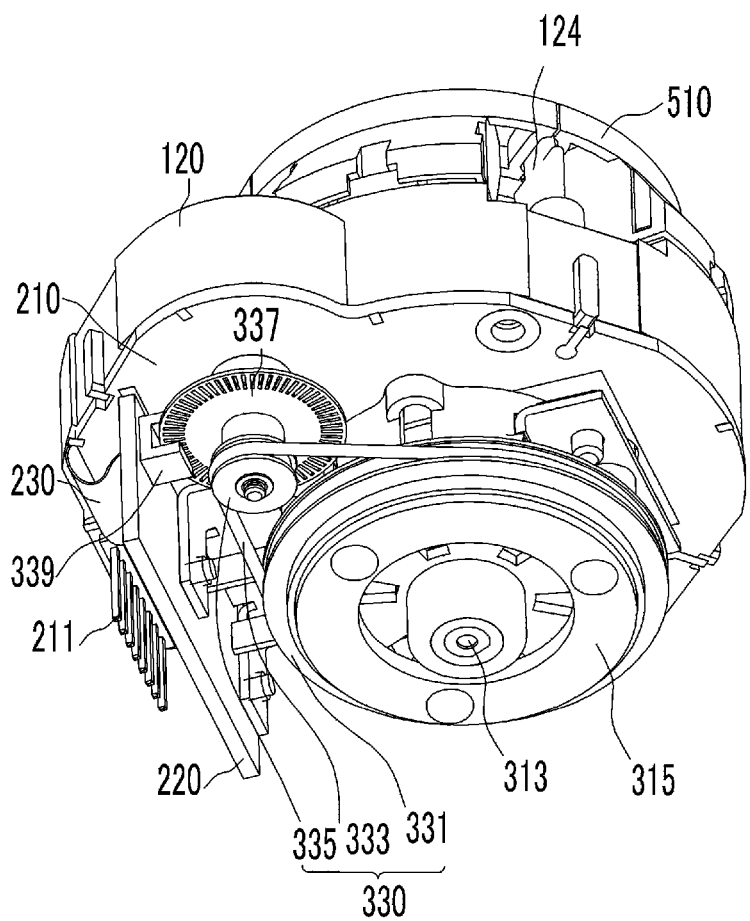
FIG. 11 is a partial enlarged bottom perspective view illustrating a haptic steering wheel switch apparatus according to one embodiment of the present invention.

The haptic wheel device sensing unit 330 is implemented as a light detector in this embodiment. The haptic wheel device sensing unit 330 includes a device sensing body part 330a and the device detecting sensor part 339. The device sensing body part 330a is connected with the haptic wheel device actuator 310 to output the rotation state of the haptic shaft, and the device detecting sensor part 319 detects the rotation state of the device sensing body part 330a. In this embodiment, although the device sensing body part is constructed as a structure for mechanically transferring the rotation state of the haptic shaft, and the device detecting sensor part is implemented as a photosensor for detecting the rotation of the device sensing body part, a construction may be implemented in which the device sensing body part includes a magnet and the device detecting sensor part includes a magnetic sensor. The device sensing body part 330a of this embodiment includes a device sensing main pulley 331, a device sensing sub-pulley 335, a device sensing belt 333, and device slot 337. The device sensing main pulley 331 is connected with the shaft sensing holder 314 in such a fashion that the relative rotation between the device sensing main pulley 331 and the shaft sensing holder 314 is restricted, so that it is rotated together with the second end 313 of the haptic shaft. The device sensing main pulley 331 has a main pulley mounting hole 332 (see FIG. 10) formed at the center thereof so that the shaft sensing holder 314 is inserted into and accommodated in the main pulley mounting hole 332. Disposed at a lower end of the device sensing main pulley 331 is a shaft inertial body 315 serving as a constituent element for achieving a stable operation of the haptic shaft through the device sensing main pulley 331 and producing an accurate inner force sense. The shaft inertial body 315 is constructed of a donut type so that it is fittingly disposed around the outer circumference of the main pulley mounting hole 332 of the device sensing main pulley 331. The shaft inertial body 315 and the device sensing main pulley 331 may be integrally formed with each other, if necessary, but the shaft inertial body according to this embodiment is formed as a separate element so that it is securely mounted to the lower end of the device sensing main pulley 331 through a fastening member such as a bolt.

The device sensing sub-pulley 335 is connected with the device sensing main pulley 331 so as to be spaced apart from the device sensing main pulley 311, and the device sensing belt 333 interconnects the device sensing main pulley 331 and the device sensing sub-pulley 335 to transfer the mechanical rotation state of the device sensing main pulley 331 to the device sensing sub-pulley 335. The device slot 337 has a structure of being coaxially connected to the device sensing sub-pulley 335, and is rotated together with the device sensing sub-pulley 335 when the device sensing sub-pulley 335 is rotated. The device slot 337 is rotatably supported by the sub-pulley shaft 336. The sub-pulley shaft 336 is rotatably mounted to the fixture base 323 of the haptic wheel device fixture 320. In this case, the sub-pulley shaft 336 is insertedly disposed in the fixture base sensing mounting part 325 of the fixture base 323. The device sensing sub-pulley 335 and the device slot 337 are mounted to the sub-pulley shaft 336. A sub-pulley bushing 338 may be further provided between the sub-pulley shaft 336 and the device sensing sub-pulley 335 in order to achieve a smooth rotation between the fixture base 323 and the device sensing sub-pulley 335. The device detecting sensor part 339 is disposed on the sensing board 220 so as to be adjacent to the device slot 337. The device detecting sensor part 339 is implemented as a photosensor. The device slot 337 is disposed between a light emitting section and a light receiving section of the device detecting sensor part 339 so that the rotation state of the second end of the haptic shaft is converted into an optical signal by the device detecting sensor part via the device sensing main pulley, the device sensing belt, the device sensing sub-pulley, and the device slot to allow the device detecting sensor part to output a change in an electrical signal. Such a change in electrical signal can be transmitted to an internal or external electrical device such as a control unit through the connector pin disposed in the wheel housing base connector 132.

In this embodiment, a rotation ratio of the device sensing main pulley 331 to the device sensing sub-pulley 335 preferably has a value of more than 1. While the haptic knob 301 manipulated through a driver's finger is rotated once, i.e., the device sensing main pulley 331 connected to the haptic knob 301 and performing a coaxial rotation is rotated once, the device sensing sub-pulley 335 is rotated several times, so that a resolving power through the device detecting sensor part 339 for once rotation of the haptic knob 301 can be ultimately increased to achieve more accurate detection of the haptic knob 301 and the haptic shaft.

In the above embodiment, although it has been described that the haptic wheel device sensing unit adopts a pulley/belt structure, it may be constructed in various manners within a range of sensing the accurate rotation state of the haptic knob or the haptic shaft, such as adopting a gear transmission structure. In the case where the haptic wheel device sensing unit adopts the gear transmission structure, a gear of the haptic shaft side and a gear in which the device slot of the haptic wheel device sensing unit is disposed may be directly connected with each other, and more than one idle gear may be connectedly disposed between these gears, if necessary. In addition, in the above embodiment, although the haptic wheel device sensing unit is implemented as a photosensor structure, it may be constructed in various manners within a range of sensing the rotation state of the haptic knob.

By virtue of the constructions of the haptic knob, the haptic wheel device actuator, and the haptic wheel device sensing unit, a manipulation state involving the intention of a manipulator is detected by the haptic wheel device sensing unit via the haptic knob, and a predetermined inner force sense signal generated from the haptic wheel device actuator implemented as a two-axis motor is applied to the manipulator through the haptic knob in a predetermined manner transferred from the internal or external electrical device to implement the operation such as a warning or the like in response to the manipulation state detected by the haptic wheel device sensing unit or in a predetermined manner, so that the manipulator can achieve a more stable and accurate tactile perception. The haptic knob 301 achieves a rotary operation on a substantial plane on which the vehicle steering wheel 2 is arranged in such a fashion that the haptic knob 301 performs the rotary motion about the haptic shaft acting as a central axis. By virtue of the rotary operation, a user can maintain the steering state through the wheel rim 2A of the vehicle steering wheel 2 and simultaneously can implement a thumb-wheel type operation enabling the manipulation of the haptic steering wheel switch apparatus 10 through his or her thumb. This can enhance a manipulation function such as smooth selection of preset menus through the haptic knob even without diverting a driver's driving attention in a state of gripping the wheel rim by eliminating the operation of having to separate a driver's hand from the steering wheel, more specifically, the wheel rim to manipulate the switch. For example, in implementation of a device for displaying a predetermined select menu on a screen by associating a conventional structure performing a seesaw operation or a scroll operation about a hinge point with a display device, problems are involved in that since it is difficult for a driver to control a select manipulation at the time of making a predetermined menu selection, the driver is apt to pass by a menu which he or she wants to select. On the other hand, in case of the haptic steering wheel switch apparatus of a thumb-wheel driving type, an advantage is involved in that the driver can rapidly and accurately select a menu which he or she wants through the rotary operation by the driver's thumb in a clockwise or counter-clockwise direction, thereby achieving a smoother provision of an inner force sense. In addition, a user interface associated with the rotary operation of the haptic steering wheel switch apparatus can also be produced in various manners.

In the meantime, the haptic steering wheel switch apparatus according to the present invention enables a push operation through the haptic knob, i.e., a vertical movement in a longitudinal direction perpendicular to the plane on which the vehicle steering wheel is arranged. By virtue of such a structure, the inventive haptic steering wheel switch apparatus can implement various operations through a smooth tactile rotary operation and push operation based on a thumb-wheel driving method. The haptic steering wheel switch apparatus may further include a push switch unit 400 for outputting a change in a switching signal through the vertical movement of the haptic steering wheel switch apparatus. The push switch unit 400 includes a push switch 410 and a push switch operating part 420. The push switch 410 is disposed on one surface of the main board 210 of the circuit board unit 200. Although the push switch 410 is implemented as a tact switch which is vertically operated in this embodiment, it may be constructed in various manners within a range of performing a push operation, such as being implemented as a metal dome switch. The push switch operating part 420 is moved vertically together with the haptic wheel device actuator 310 to turn on or off the push switch 410. The push switch operating part 420 includes a push switch operating body 421 and a push switch operating protrusion 423. The push switch operating body 421 has a ring type structure. The push switch operating body 421 has a through-hole 422 formed at the center thereof so that the haptic wheel device fixture 320 disposed on the outer circumference of the haptic wheel device actuator 310 is penetratingly disposed in the through-hole 4221. A push switch mounting part 424 is formed on the inner circumferential surface of the through-hole 422 of the push switch operating body 421 and a fixture body push switch mounting part 322 is formed on the outer circumferential surface of the haptic wheel device fixture 320 to correspond to the push switch mounting part 424. Thus, the push switch mounting part 424 is engaged with the fixture body push switch mounting part 322 so that the push switch operating body 421 and the haptic wheel device fixture 320 can be stably assembled with each other and can be maintained in a mounted state. In addition, the push switch operating part 420 may have a structure in which a fastening element is provided on the outer circumfential surface of the push switch operating body 421 so that the push switch operating body and the haptic wheel device fixture can be fastened to each other upon the engagement between the fixture body and the fixture base.

The push switch operating protrusion 423 is disposed on the outer circumference of the push switch operating body 421, so that it can establish a direct contact with the push switch 410, can constantly maintain the support state of a structure in which the push switch operating protrusion 423, the push switch operating body 421, the haptic wheel device fixture 320, the haptic wheel device actuator 310, and the haptic knob 301 are connected sequentially through an initial support state of the push switch 410, and can establish a predetermined vertical movement state when an external force larger than a force applied to the push switch 410 is applied to the haptic knob 301

In one embodiment of the present invention, the push switch 410 is provided in plural numbers. The push switch operating protrusion 423 is also provided in plural numbers to correspond to a plurality of push switches 410. In this embodiment, by virtue of the push switches 410 and the push switch operating protrusion 423, the number of each of which is four, the haptic wheel device actuator 310 and the haptic knob 301 can establish a stable support state through the push switches 410.

At the normal times when an external force is not exerted to the haptic knob, the haptic wheel device actuator 310 establishes a stable vertical support state through the push switches 410. On the other hand, when a user such as a driver vertically presses the haptic knob 301 with a force of more than a preset value, there occurs a change in an electrical signal of the push switch 410 via the haptic knob 301, the haptic wheel device actuator 310, the haptic wheel device fixture 320, and the push switch operating part 420. In this embodiment, the number of the push switch 410 provided is four, and an individual switching operation may be implemented depending on the pressing direction of the haptic knob 301. For example, a tilting operation may be implemented in which when the user presses the top right end of the haptic knob 301, only a certain region is pressurized so that the haptic wheel device actuator 310 is moved downwardly at one side end thereof only. On the other hand, when the user vertically presses the haptic knob 301 connected with the haptic wheel device actuator 310 while maintaining the central region of the haptic knob 301 in a horizontal state, the entire vertical pressing operation is achieved so that signals may be generated from four push switches. A structure may be implemented in which when the push switches disposed diagonally relative to the center of the haptic knob 301, i.e., the central axis of the haptic wheel device actuator 310 are pressed concurrently or continuously within a certain time, this is recognized to be an entire vertical pressing operation, but not an each individual tilting operation.

Meanwhile, the push switch unit 400 may have a structure in which the push switches 410 are securely disposed on the main board 210 and only the push switch operating part 420 is vertically moved together with the haptic wheel device actuator 310 whereas the haptic wheel device sensing unit 330 is vertically moved together with haptic wheel device actuator. The sensing board 220 is securely disposed on the fixture base 323 of haptic wheel device fixture 320 on which the haptic wheel device actuator 310 is disposed, and the device sensing main pulley of the device sensing body part is connected to the haptic shaft and the device sensing subpulley is connected to the fixture base, so that the device detecting sensor part and the device sensing body part establish a structure in which they are ultimately vertically moved together with the haptic wheel device. By virtue of this structure, the connection between the push switch unit implementing the push operation and the haptic wheel device implementing the rotary operation is ultimately made through the haptic knob, so that an excellent manipulation feeling can be imparted to a manipulator such as a driver through the integration of the vertical push operation and the rotary operation and diversified operations can be implemented, such as achieving a stable tilting function simultaneously.

Figure 5:
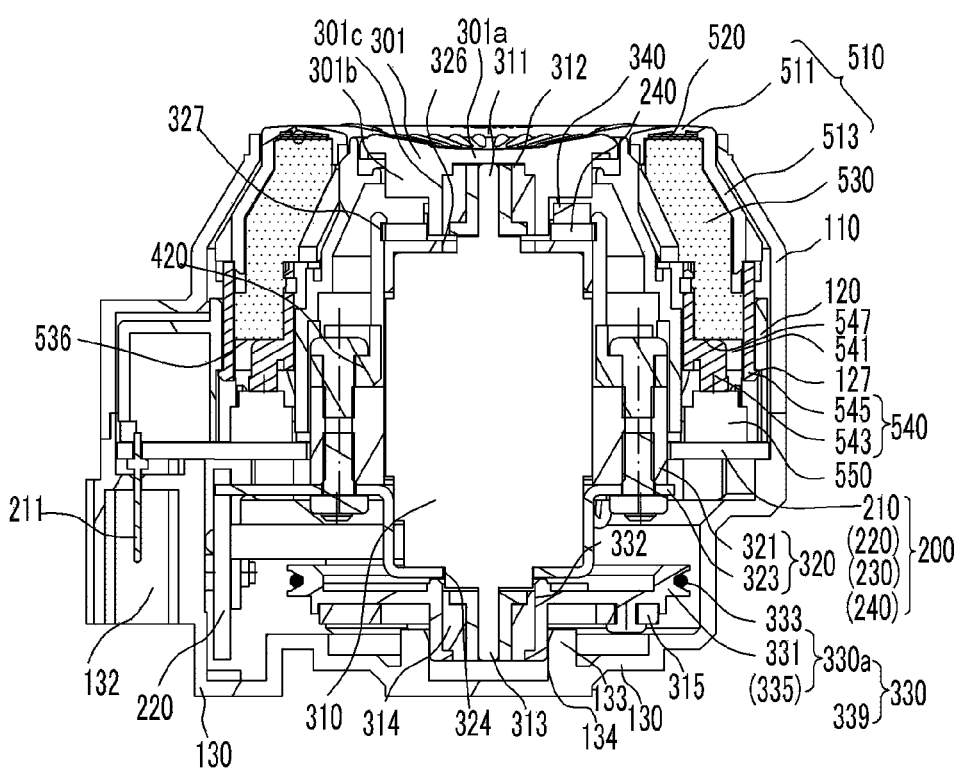
FIG. 5 is a schematic cross-sectional view illustrating a haptic steering wheel switch apparatus according to one embodiment of the present invention.
Figure 15:
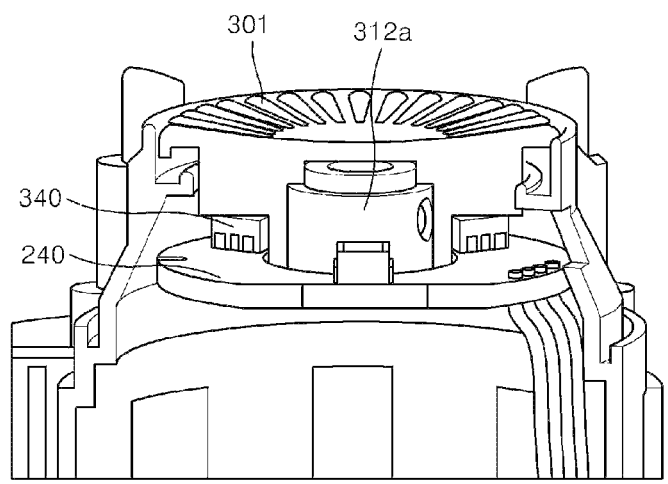
FIG. 15 is a schematic perspective view illustrating a modified example of a shaft knob holder of a haptic steering wheel switch apparatus according to one embodiment of the present invention.
Figure 16:
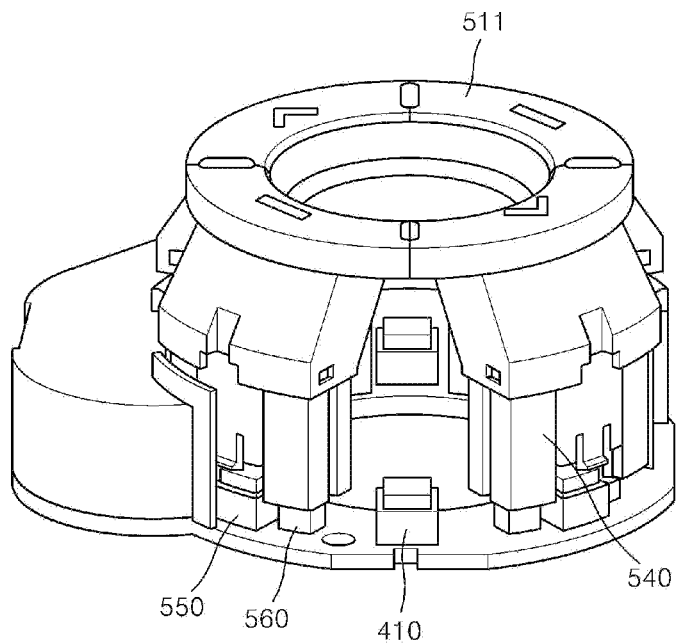
FIG. 16 is a schematic partial enlarged perspective view illustrating a button switch unit of a haptic steering wheel switch apparatus according to one embodiment of the present invention.

The haptic steering wheel switch apparatus may further include a construction which can improve the visual perception through the output of light at the time of implementing the rotary operation and the push/tilting operation and performing each function. The haptic wheel device 300 of the present invention may include a haptic knob light source unit 340. The haptic knob light source unit 340 (see FIG. 15) is disposed on the knob board 240 of the circuit board unit 200. The knob board 240 is disposed on the top end of the haptic wheel device actuator 310 in such a fashion that the first end 311 of the haptic shaft 311 is penetratingly disposed at an end of the haptic wheel device actuator 310. More specifically, the knob board seating part 327 is formed on the upper end of the fixture body 321 so that the knob board 240 is seated in the knob board seating part 327 (see FIG. 5). In this case, the knob board 240 can establish an electrical connection with the main board 210 through a separate line. The haptic knob light source unit 340 is disposed on one surface of the knob board 240 and is implemented as an LED. The haptic knob 301 is formed of a light-transmitting material such as polycarbonate (PC) so that light exiting the haptic knob light source unit 340 on the knob board 240 can be smoothly transferred to the outside. The haptic knob light source unit 340 can be provided in plural numbers. The haptic knob light source unit 340 according to the present invention is constructed such that the LEDs that emit light of blue, green, and red colors are arranged equiangularly on the knob board 240 or a unified module is arranged in plural numbers to output a multicolor. Light emitted from the haptic knob light source unit 340 implemented as LEDs is transmitted and/or guided through a bottom surface of the haptic knob body 301b and is outputted to the outside. The haptic knob light source unit 340 is operated such that light of various colors, sizes and cycles is outputted to the outside in a predetermined controlled manner, such as flickering light in a predetermined manner, for example, cyclically over a predetermined period of time, outputting the light in a signal cycle changed constantly, or outputting given colors simultaneously to output a combined color, so that a user such as a driver can visually rapidly perceive the operation state of the haptic steering wheel switch apparatus or the manipulation state selected by the user.

In the meantime, the haptic steering wheel switch apparatus 10 according to the present invention includes a button switch unit 500 so that the button switch unit and the haptic wheel device can perform a combined manipulation function. The button switch unit 500 is disposed at an outside of the haptic knob 301. In this case, the button switch unit 500 can achieve a separate vertical operation independently of the haptic wheel device actuator or the push switch unit through the haptic knob 301 to generate a certain changed switching signal.

The button switch unit 500 according to the embodiment of the present invention is constructed in such a fashion as to surround an outer periphery of the haptic knob 301. The button switch unit 500 includes a button knob 510, a button guide 530, a button guide holder 540, and a button switch 550. The button knob 510 is disposed on the outside of the haptic knob 301 in such a fashion as to be exposed at one surface thereof to the outside of the haptic wheel housing unit 100. The button knob 510 includes a head 511 and a body 513. The button knob head 511 is exposedly disposed on the outside of the haptic knob 301, and the button knob body 513 is disposed at a lower end of the button knob head 511. Although the button knob head 511 and the button knob body 513 are integrally formed with each other in this embodiment, they may be formed separately from each other.

A button knob icon 512 can be indicated on one surface of the button knob head 511, and may be directly formed on one surface of the button knob head 511. The button knob head 512 may have a structure in which it is formed of a transparent material such as polycarbonate, if necessary, so that the button knob icon is outputted through a separate display device.

The button knob head 511 and the button knob body 513 are constructed to define an inner space therebetween so that the button guide 530 can be disposed in the inner space. The button guide 530 is disposed at one end thereof within the button knob 510 and is disposed at the other end thereof within the haptic wheel housing unit 100 toward the circuit board unit 200. That is, the button guide 530 is disposed in an inner space defined between the button knob head 511 and the button knob body 513 in such a fashion as to be oriented at the other end thereof toward the main board 210. The button guide 530 includes a head 531 and a body 533. Although the button guide head 531 and the button guide body 533 are integrally formed with each other in this embodiment, they may be formed separately from each other. The button guide body 533 is connected to one end of the button guide head 531, and a top end of the button guide head 531 is insertedly disposed in the inner space defined between the button knob head 511 and the button knob body 513. A bottom end of the button guide body 533 is disposed within the button guide holder 540 in such a fashion as to be oriented toward the main board 210. The button guide 530 is formed of a transparent or colored light guide material so that light entering the button guide 530 through an end of the button guide body 533 is transferred to the outside through one surface of the button guide body 533. A male mounting part 535 is formed on a side of the button guide body 533 and a female mounting part 544 is formed on a side of the button guide holder 540 to correspond to the male mounting part 535, so that the male mounting part 535 and the female mounting part 544 are fittingly engaged with each other. The button guide body 533 includes a groove 534 formed on the outer circumferential surface thereof so that the groove 534 is engaged with a holder receiving groove 542 formed on the button guide holder 540 to establish a smooth relative mounting structure between the button guide 530 and the button guide holder 540 so that a possibility of an erroneous assembly upon the smooth mounting and assembly of the haptic wheel housing unit 100 can be avoided.

The button guide holder 540 is attached to the button guide 530, and is disposed in the haptic wheel housing unit 100, more specifically, the wheel housing body 120 in a vertically stable movable manner together with the button guide 530. The button guide holder 540 is inserted into a button knob through-hole 125 formed on one surface of the wheel housing body 120 in a vertically movable manner. The button guide holder 540 has a button guide holder line 546 formed on the outer surface thereof along the longitudinal direction thereof. A button holder guide 126 is formed on the inner surface of the button knob through-hole 125 to correspond to the button guide holder line 546 so that the button guide holder line 546 and the button holder guide 126 can be engaged with each other in a vertical movable manner.

The button guide holder 540 includes a button guide holder operating part 543 extending downwardly from a lower end of the inside surface of a button guide holder accommodating part 541 formed at the center of the button guide holder 540 so that the button guide holder operating part 543 can maintain a constant contact state with a button switch 550 disposed below the button guide holder. That is, the button guide holder 540, the button guide 530, and the button knob 510 may have a structure in which they are supported by a separate support means, but have a structure in which they are sequentially supported by the button switch 550 in this embodiment.

By virtue of such a structure, a pressure applied to the button knob 510 by a user such as a driver is transferred to the button switch 550 through the button guide holder 540. In this case, the button guide holder operating part 543 has a structure in which it extends downwardly from the inner surface of a button guide holder accommodating part 541 so as to be oriented toward the bottom. The button guide holder operating part 543 has a seating face 547 formed on a top surface thereof to establish a seated state of a button guide body retaining part 536. That is, the button guide 530 has two button branches 537 formed at a lower end thereof and the button guide body retaining part 536 formed at the center thereof so that the button guide body retaining part 536 is brought into close contact with the button guide holder operating part seating face 547 to achieve a stable mounting structure. The button guide branches 537 are branched from the lower end of the button guide body 530 to achieve a structure in which light emitted from a pair of button light source units 560 disposed at both sides of a button switch 550 can be transferred to the top. The button light source units 560 are implemented as LEDs, or the like. The button light source unit 560 can be disposed in plural numbers relative to each button guide to achieve a structure in which it is individually allocated to the pair of button guide branches. The button guide 530 may be formed of a transparent light guide material such as polycarbonate or may have a structure having a predetermined color.

Figure 17:
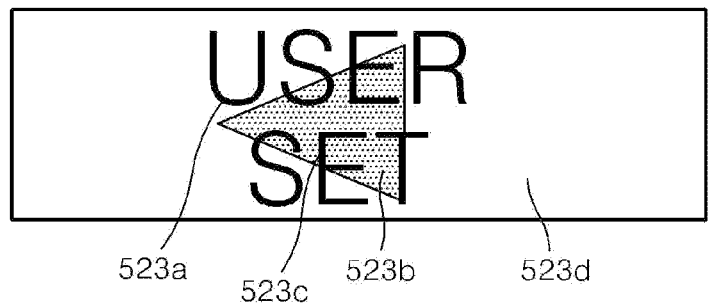
FIG. 17 is a schematic top plan view illustrating a button color filter body of a button color filter of a haptic steering wheel switch apparatus according to one embodiment of the present invention.
Figure 27:
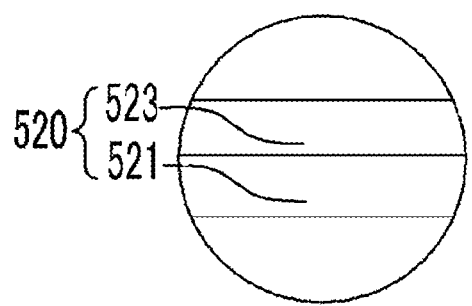
FIG. 27 is a partially enlarged view of FIG. 5, which shows a button color filter of a haptic steering wheel switch apparatus in more detail.

In addition, the button switch unit 500 may further include a display device that can form various icons using light exiting the button light source unit. At the same time, the button light source unit has a structure of outputting light having a plurality of colors relative to each button guide or each button color filter. The button switch unit 500 may further include a button color filter 520. The button color filter 520 includes a button color filter base 521 and a button color filter body 523, as shown in FIG. 27. The button color filter base 521 is formed as a light guide material to serve to uniformly disperse light entering through a bottom surface of the button color filter base 521. The button color filter body 523 includes a first transmitting region 523a that allows first color light to exit the button light source unit outputting light having a plurality of colors, a second transmitting region 523b that allows second color light different from the first color light to exit the button light source unit, an intersecting region 523c where the first transmitting region and the second transmitting region intersect each other, and a blocking region 523d that blocks the first color light and the second color light, as shown in FIG. 17. The intersecting region 523c can form a first button icon 512a and a second button icon 512b together with the first transmitting region 523a and the second transmitting region 523c. For example, the button light source unit can include a red LED and a blue LED. The first transmitting region allows red color to exit and the second transmitting region allows blue light to exit so that a predetermined icon such as "USER SET" or "◁" can be displayed through the first transmitting region, the second transmitting region, the intersecting region, and the like.

Although there has been described a structure in which the haptic steering wheel switch apparatus is disposed on a front side of the vehicle steering wheel in the above embodiment, a haptic steering wheel switch apparatus 10s may be disposed on a rear side of the vehicle steering wheel in another embodiment. That is, as shown in FIGS. 18 and 19, the haptic steering wheel switch apparatus 10s is disposed on a rear side of the steering wheel 2. As shown in FIG. 19, a rotation central axis of a haptic shaft of the haptic steering wheel switch apparatus 10s, ultimately a rotation central axis II-II of a haptic knob 301s of the haptic steering wheel switch apparatus 10s is disposed in parallel with a plane PLN on which the vehicle steering wheel 2 is arranged is rotated, so that a driver can operate haptic steering wheel switch apparatus 10s more smoothly using his or her finger such as an index finger, a middle finger, or the like except a thumb and can deliver a tactile sensation to the driver.

Figure 21:
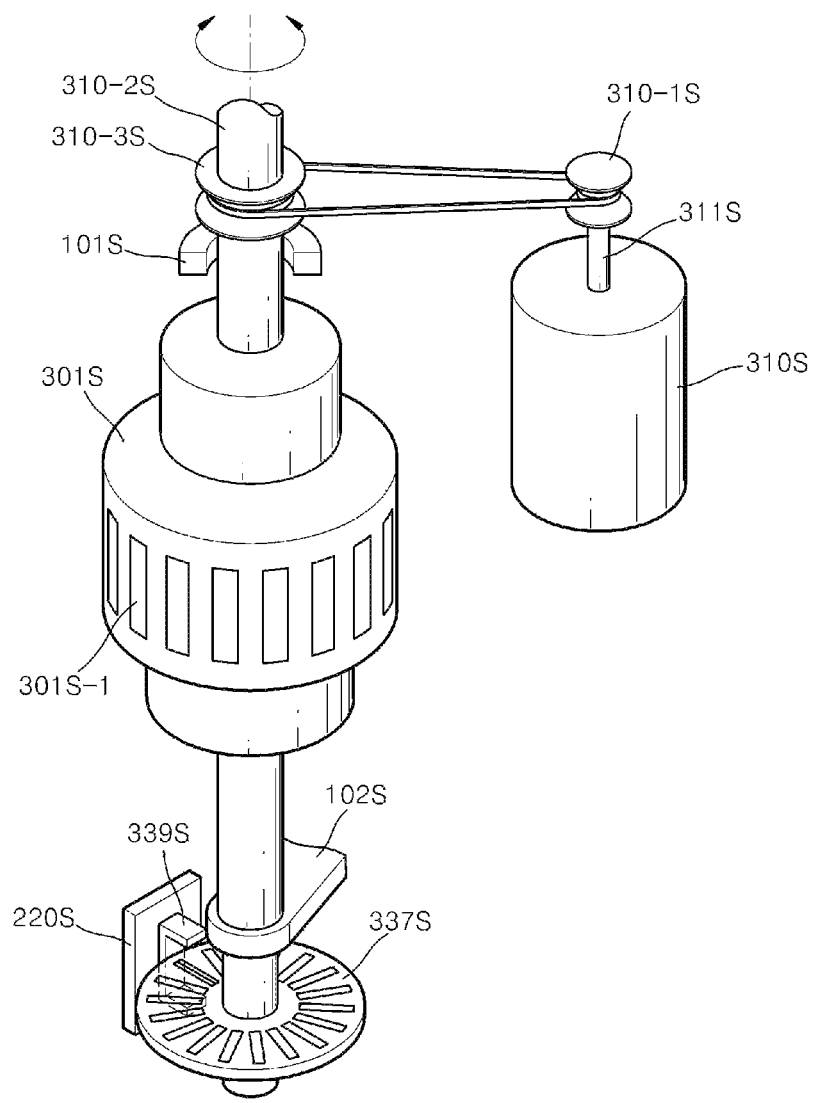
FIG. 21 is a schematic partial perspective view illustrating a haptic steering wheel switch apparatus according to another embodiment of the present invention.

As shown in FIG. 21, the haptic steering wheel switch apparatus 10s includes a haptic wheel housing unit 100s, a circuit board unit, and a haptic wheel device 300s. The haptic wheel housing unit 100s has a structure in which it is integrally formed with a wheel body of the vehicle steering wheel, and may be modified in various manners, such as having a structure in which the circuit board unit is embedded in the haptic wheel housing unit. In this embodiment, the construction of the haptic steering wheel switch apparatus 10s will be described hereinafter focused on the haptic wheel device 300s. The haptic wheel device 300s includes a haptic wheel device actuator 310s having a haptic shaft 311s, a haptic knob 301s connected to the haptic shaft 311s and exposed to the outside, and a haptic wheel device sensing unit 330s configured to detect the rotation state of the haptic shaft 311s. The haptic wheel device actuator 310s can be implemented as an electric motor. The haptic wheel device actuator 310s and the haptic knob 301s are connected to each other through a haptic transmitting unit 310-1s, 310-2s and 310-3s. That is, a haptic transmitting pulley 310-1s is disposed at an end of the haptic shaft 311s, and the haptic connecting pulley 310-3s is disposed at an end 301-2s of a haptic knob body 301-1s of the haptic knob 301s. The haptic transmitting pulley 310-1s and the haptic connecting pulley 310-3s are connected with each other through the haptic transmitting 310-2s so that power from the haptic wheel device actuator 310s can be transmitted to the haptic transmitting pulley and the haptic connecting pulley to cause a predetermined haptic function to be applied to the haptic knob. Although it has been described that the transmission of the power from the haptic wheel device actuator 310s to the haptic knob is performed through a pulley structure in this embodiment, it may be modified in various manners, such as achieving a structure in which the haptic wheel device actuator and the haptic knob are directly connected with each other.

In this case, the haptic knob 301s is disposed within a haptic wheel housing unit (not shown), and may further include a support structure for implementing a stable rotation through haptic knob guides 101s and 102s extending from the haptic wheel housing unit.

The haptic wheel device sensing unit 330s is connected with the haptic knob 301s. That is, the haptic wheel device sensing unit 330s includes a device sensing slot 337s and a device detecting sensor part 339s. The device sensing slot 337s can be coaxially connected to the haptic knob 301s. The device detecting sensor part 339s can be implemented as a photosensor disposed adjacent to the device sensing slot 337s. The device detecting sensor part 339s may be implemented as a magnetic sensor, if necessary. The device detecting sensor part 339s is disposed on a sensing board 220s of a circuit board unit. By virtue of this structure, a predetermined haptic operation is implemented and the rotation operation of the haptic knob through the haptic knob manipulated by a driver can be sensed so that a certain switching function and accurate inner force sense information can be provided.

Figure 22:
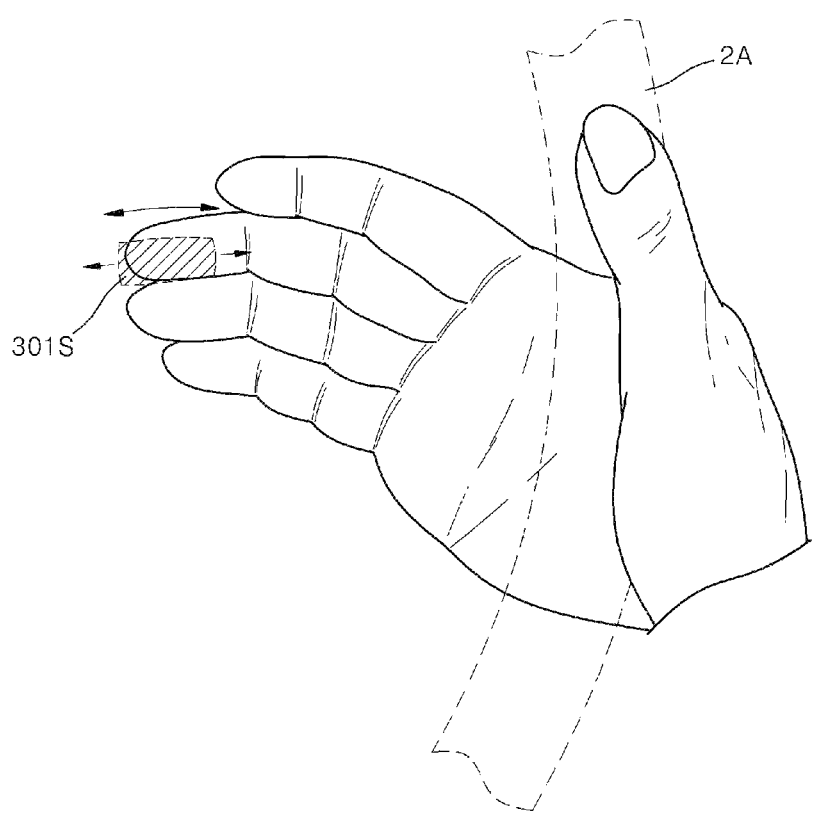
FIG. 22 is a schematic state view illustrating a positional relationship between a driver and a haptic steering wheel switch apparatus according to another embodiment of the present invention, which is manipulated by the driver.

FIG. 22 shows the state in which a driver operates the haptic steering wheel switch apparatus disposed on a rear side of the vehicle steering wheel 2 according to another embodiment. Typically, since there is a high possibility that a certain switching operation is performed at the time of driving on a straight road rather than on a curved road, the driver who drives on the straight road can manipulate the haptic knob 301s using his or her finger such as a middle finger while gripping a wheel rim 2A of the vehicle steering wheel 2, and can smoothly receive predetermined inner force sense information through the haptic knob 301s. As such, the haptic knob 301s is disposed on the rear side of the vehicle steering wheel 2 in such a fashion as to be spaced apart within a predetermined distance from the wheel rim 2A of the vehicle steering wheel. In this embodiment, the predetermined distance spaced apart from the wheel rim 2A is set to 5 cm or 20 cm, but is preferably selected within a range of enabling the smooth manipulation of the haptic knob while the driver grips the wheel rim 2A of the vehicle steering wheel 2 with his or her finger except a thumb. Moreover, the operation of the haptic steering wheel switch apparatus can be controlled by determining whether to rotate the steering wheel based on an undesired contact with the haptic knob during the rotation of the steering wheel and an intention of the driver using a signal generated from a steering angle sensor (not shown).

Figure 23:
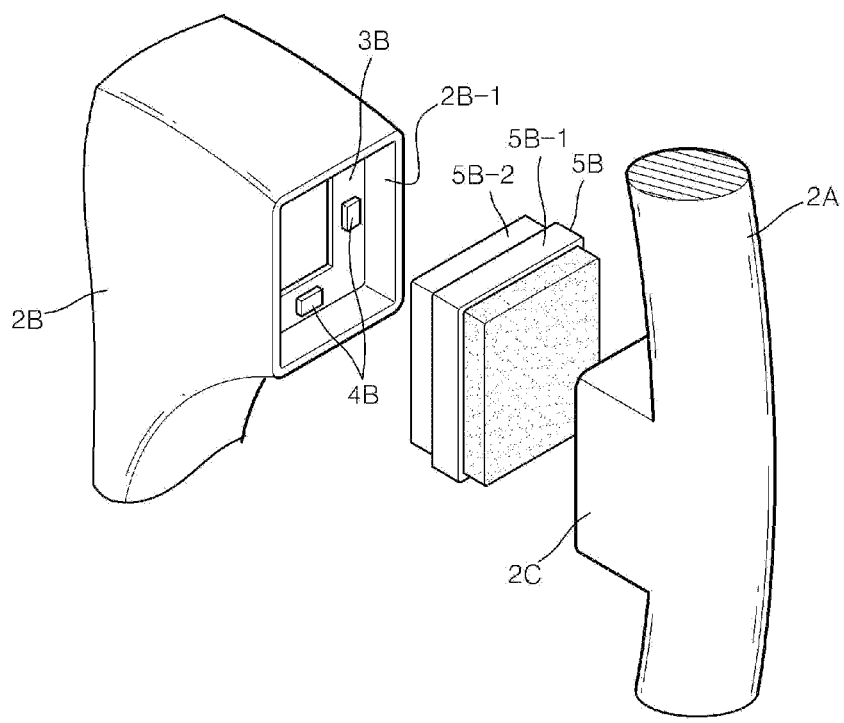
FIG. 23 is a schematic partial perspective view illustrating a steering wheel light source unit of a haptic steering wheel switch apparatus according to another embodiment of the present invention.

In the meantime, the haptic steering wheel switch apparatus 10 of the present invention may further include a separate light source unit at a region except the haptic knob or the button knob so as to output light corresponding to the switching operation or output light to inform a driver of the state where the vehicle enters in a predetermined warning state of the vehicle. That is, the haptic steering wheel switch apparatus 10 according to the present invention include steering wheel light source units 4B and 5B. The steering wheel light source units 4B and 5B are disposed on the vehicle steering wheel 2. More specifically, as shown in FIG. 23, the steering wheel light source units 4B and 5B are disposed between a wheel hub body 2B and a wheel spoke 2C. The steering wheel light source units 4B and 5B includes a steering wheel light source 4B and a steering wheel light transferring part 5B. The steering wheel light source 4B is implemented as an LED, or the like. In this embodiment, the steering wheel light source 4B is disposed on a side of the wheel hub body 2B. A steering wheel light source board 3B is disposed in a accommodating part 2B-1 of the wheel hub body 2B, and a steering wheel light source 4B is disposed on one surface of the steering wheel light source board 3B. the number of the steering wheel light sources 4B and the color of light outputted from the steering wheel light sources 4B can be constructed in various manners. The steering wheel light transferring part 5B can be implemented as a light guide. The steering wheel light transferring part 5B includes a light transferring body 5B-1 and a light transferring and inputting part 5B-2. Light exiting the steering wheel light source 4B through the light transferring and inputting part 5B-2 is outputted to the outside through the light transferring body 5B-1. By virtue of such a light output function, the driver makes a rapid perception of an optical signal through so that he or she can cope with the output signal smoothly. Light outputted through the steering wheel light source unit may be predetermined light corresponding to the rotation operation of the haptic knob. In addition, the light may be outputted through the steering wheel light source unit in response to an electrical signal applied from an external vehicle control device, if necessary. For example, when it is required to provide a driver with a predetermined warning or informing function, such as the warning against non-release of a parking brake, opening of a vehicle door or a trunk, failure of ABS, discharge of a vehicle battery or drop in the charge level of an electric vehicle, engine oil pressure, low or high pressure of a tire, non-wearing of a seat belt, engine check warning, or the like, a predetermined light outputting function through the steering wheel light source unit is performed so that the driver can make a rapid perception and establish a countermeasure through the rapid perception.

Such warning may be made independently of a haptic function or together with the haptic function. Each warning state can be divided into classes and the haptic function or the light output function can be preset to each class. In the case where the current state of a vehicle fall within a predetermined class, a haptic function or a light output function corresponding to the predetermined class can be performed. For example, a state such as the non-release of a parking brake, or the opening of the vehicle door or trunk, or the like is classified as class 1, and the vibration output by the haptic function and the light output through the steering wheel light source unit are set to step 1, so that the motor of the haptic wheel device actuator can produce 20% of the rated output, 20% of the maximum light output of the steering wheel light source, and set the output cycle to one second (s).

In addition, the warning against failure of ABS, discharge of a vehicle battery or drop in the charge level of an electric vehicle, engine oil pressure, low or high pressure of a tire, or the like is classified as class 2, and the vibration output by the haptic function and the light output through the steering wheel light source unit are set to step 2, so that the motor of the haptic wheel device actuator can produce 40% of the rated output, 40% of the maximum light output of the steering wheel light source, and set the output cycle to 40 millisecond (ms).

Further, the warning against low or high pressure of a tire, non-wearing of a seat belt, engine check warning, or the like is classified as class 3, and the vibration output by the haptic function and the light output through the steering wheel light source unit are set to step 3, so that the motor of the haptic wheel device actuator can produce 70% of the rated output, 70% of the maximum light output of the steering wheel light source, and set the output cycle to 10 millisecond (ms). As such, the predetermined classes may be changed depending on a design specification to change a degree of importance of a relevant wearing function.

Figure 25:
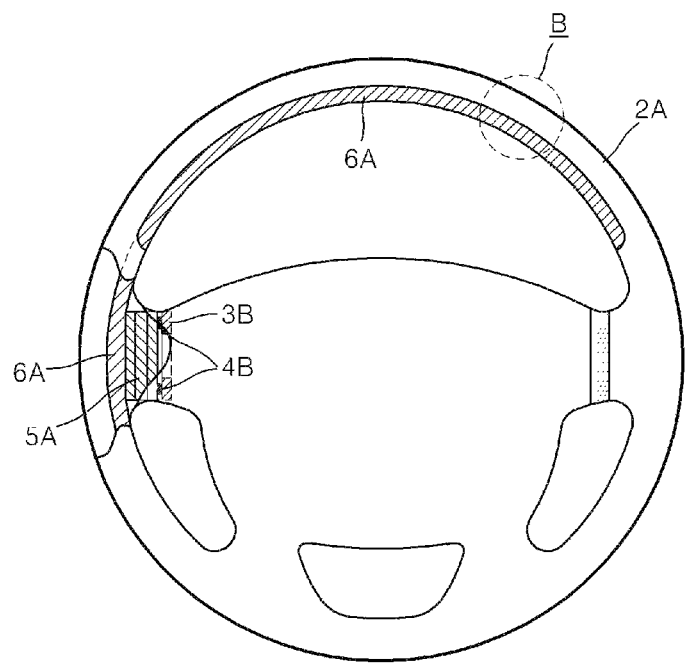
FIG. 25 is a schematic perspective view illustrating a modified example of a steering wheel light source unit of a haptic steering wheel switch apparatus according to another embodiment of the present invention.
Figure 26:
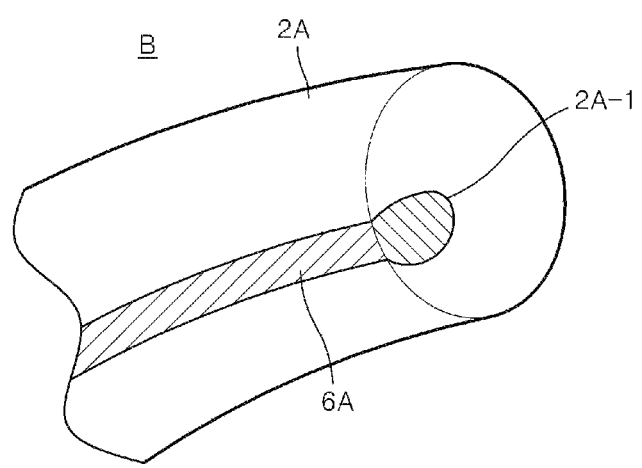
FIG. 26 is a partial enlarged perspective view illustrating a portion "B" indicated in FIG. 25.

Moreover, although it has been described a structure in which the steering wheel light source unit is disposed between the wheel hub body and the wheel spoke in the above embodiment, the steering wheel light source unit is not limited thereto, but may be modified in various manners. That is, as shown in FIGS. 25 and 26, the steering wheel light source unit may include a wheel rim light source output unit 6A. Namely, the wheel rim light source output unit 6A is disposed in the wheel rim 2A of the vehicle steering wheel 2, and is formed of a predetermined line type light guide material. The wheel rim 2A can have a light source output unit accommodating part 2A-1 formed therein. An end of the wheel rim light source output unit 6A is contactingly connected with the steering wheel light transferring part 5B that receives light from the steering wheel light source 4A as in a partially cut enlarged region in FIG. 25, so that light exiting the steering wheel light source 4A can be outputted to the outside. Although not shown in this embodiment, the wheel rim light source output unit may receive light from a separate light source. By virtue of such a construction, a smoother light output function can be performed. In addition, this light output function may be implemented through a separate output device mounted in the vehicle, such as a dashboard panel or a center fascia panel of the vehicle.

Figure 12:
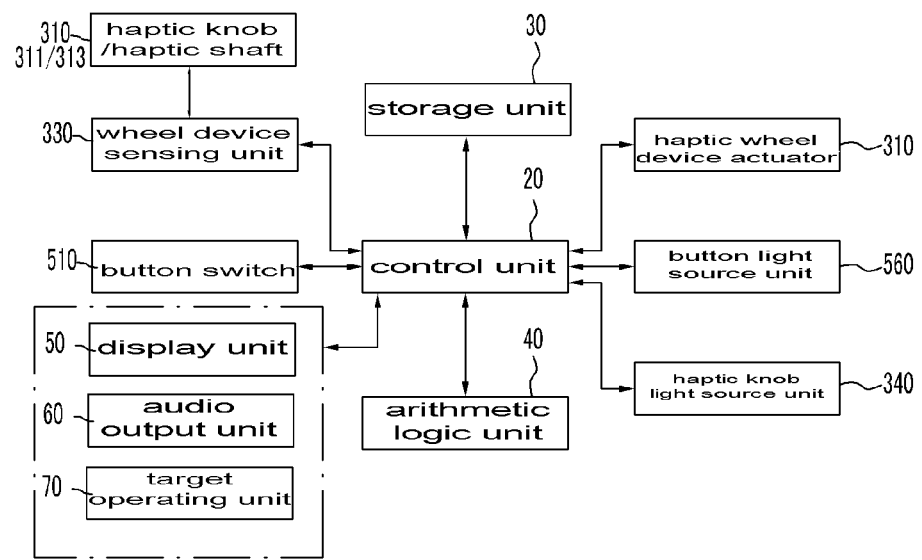
FIG. 12 is a schematic block diagram illustrating a haptic steering wheel switch system including a haptic steering wheel switch apparatus according to one embodiment of the present invention.
Figure 13:
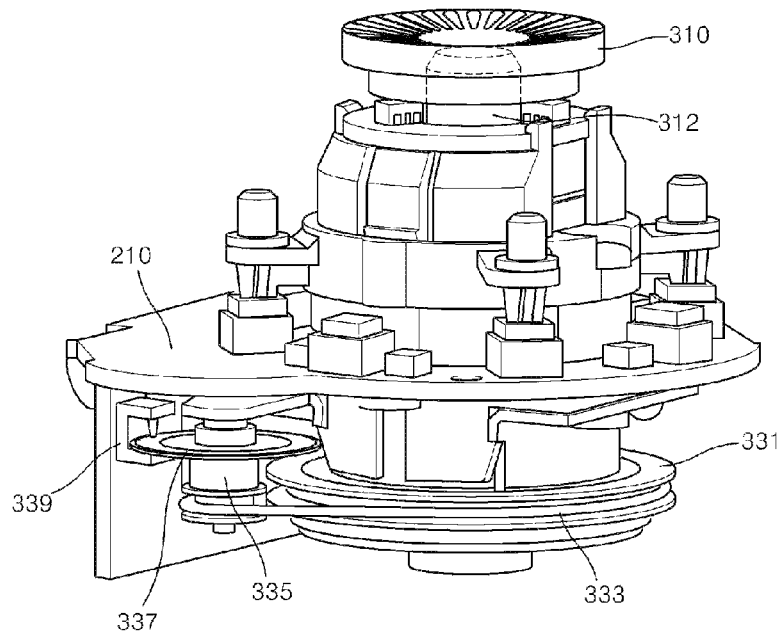
FIG. 13 is a schematic perspective view illustrating a rotary operation of a haptic knob of a haptic steering wheel switch apparatus according to one embodiment of the present invention.
Figure 14:
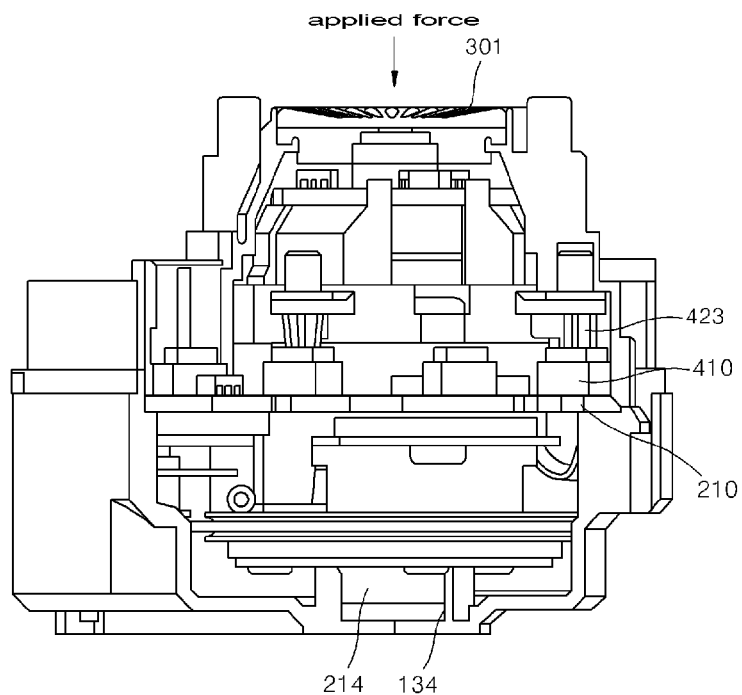
FIG. 14 is a schematic view illustrating an operation of a button switch unit of a haptic steering wheel switch apparatus according to one embodiment of the present invention.

Meanwhile, the haptic steering wheel switch apparatus according to the present invention may be included in a haptic steering wheel switch system 1 in a state in which it is implemented integratedly with other elements. That is, the haptic steering wheel switch system 1 may be implemented as a system including a storage unit 30 connected to a control unit 20 and may further include an arithmetic logic unit 40 as shown in FIG. 12. In order to implement the rotary operation through the haptic knob 301, the haptic steering wheel switch system 1 includes the haptic steering wheel switch apparatus 10, which includes the haptic wheel device actuator 310 that provides an inner force sense, the haptic wheel device sensing unit 330 that senses the rotary operation state of the haptic wheel device actuator 310, and the haptic knob 301, and which is disposed on a front or rear side of the vehicle steering wheel 2. The haptic steering wheel switch system 1 is connected with the push switch unit 400 that achieves the push operation through the vertical movement of the steering wheelhaptic wheel device actuator 310 and the button switch unit 500 that is disposed at the outside of the haptic knob, so that it transfer or receive an electrical signal to or from the push switch unit 400 and the button switch unit 500, if necessary.

Signals inputted to the haptic steering wheel switch system 1 from the switch units of the haptic steering wheel switch apparatus 10 is applied to the control unit 20 of the haptic steering wheel switch system 1. The control unit 20 produces a predetermined control signal through a given arithmetic and logic process performed by the arithmetic logic unit 40 and applies it to an output unit based on a predetermined data for the predetermined operating modes for an operating unit which it is desired to select, manipulate, and operate through the haptic steering wheel switch apparatus, for example, the operating modes such as an operating temperature control mode of an air conditioning apparatus, a navigation mode for navigation operation such as destination selection or path search, and the like, as well as an signal inputted from the haptic steering wheel switch apparatus 10. The predetermined data is stored in the storage unit 30 that establishes an electrical connection with the control unit 20. The haptic steering wheel switch system 1 may include the haptic wheel device actuator 310 included in the haptic steering wheel switch apparatus 10 as the output unit. In addition, the haptic steering wheel switch system 1 may include a separate display unit 50 for displaying an image and/or an audio output unit 60 for outputting sound as the output unit. Further, a control signal from the control unit 20 may be directly applied to a target operating unit 70 as an object to be controlled directly, for example, an operating unit such as the air conditioning apparatus and the navigator of the vehicle.

Figure 24:
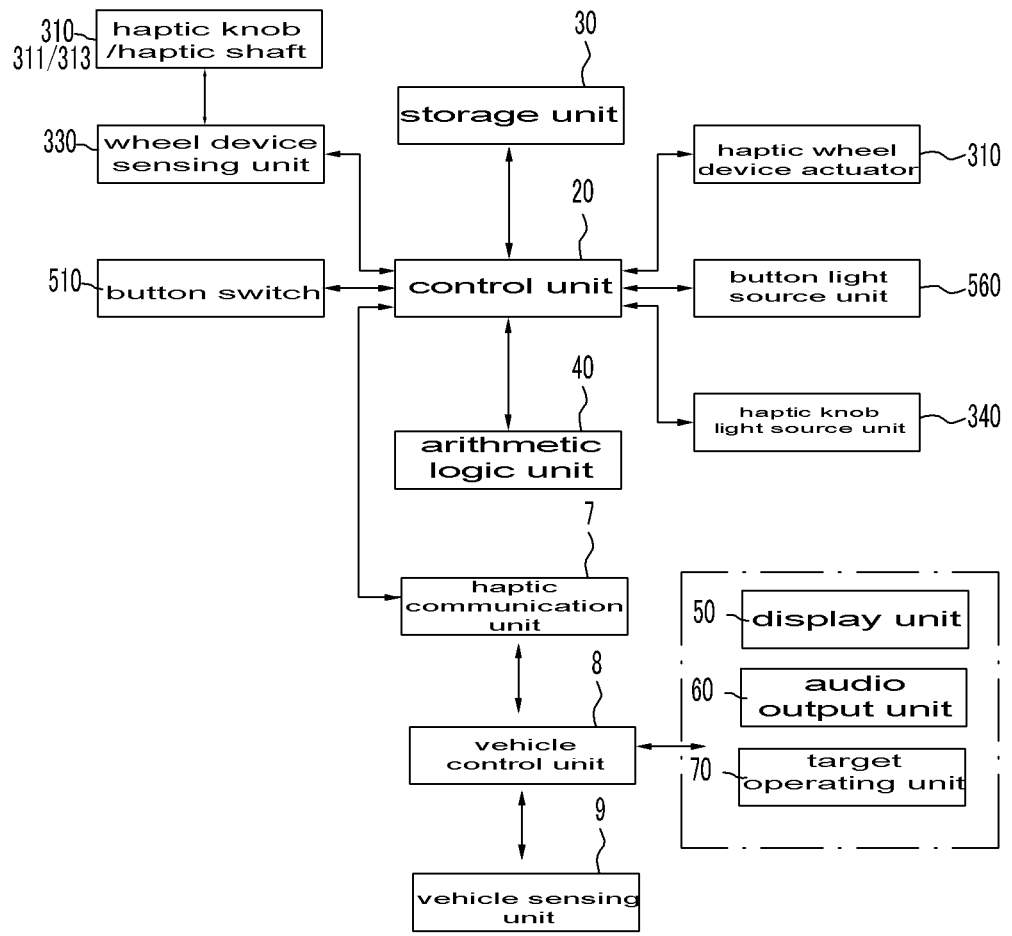
FIG. 24 is a schematic block diagram illustrating a haptic steering wheel switch system including a haptic steering wheel switch apparatus according to another embodiment of the present invention.

In addition, the haptic steering wheel switch system 1 may be implemented as a system including the storage unit 30 connected to the control unit 20 and may further include an arithmetic logic unit 40 as shown in FIG. 24. The control unit may be implemented in a single type or plural type. That is, as shown in FIG. 24, the control unit 20 establishes the communication with a separate vehicle control unit 8 or the like through a haptic communication unit 7 or the like, and may perform an output control through a separate vehicle control unit 8 performing a control function of the target operating unit 70 such as a navigator, a vehicle audio system, an air conditioning system, a warning lamp, or the like. In this case, the vehicle control unit 8 is connected with the vehicle sensing unit 9, so that it can perform a warning operation according to classification of the classes as in the above embodiment to give a warning to a driver based on a signal from the vehicle sensing unit 9 that detects the state of the vehicle, i.e., a vehicle parking brake operating signal, an engine check signal, a tire pressure sensing signal, or the like.

The above embodiments are merely illustrative for the sake of describing the present invention, and are not intended to limit the present invention but can be constructed in various manners.

The haptic steering wheel switch apparatus according to the present invention and the haptic steering wheel switch system including the same as constructed above have the following advantageous effects.

First, the haptic steering wheel switch apparatus according to the present invention and the haptic steering wheel switch system including the same are disposed on a front or rear side of the vehicle steering wheel so that a driver can smoothly manipulate the haptic steering wheel switch apparatus in a state where he or she grips the vehicle steering wheel.

Second, the haptic steering wheel switch apparatus according to the present invention and the haptic steering wheel switch system including the same include a two-axis rotation type haptic wheel device actuator so that a more compact and accurate rotation sensing structure can be achieved.

Third, the haptic steering wheel switch apparatus according to the present invention and the haptic steering wheel switch system including the same can implement the rotary operation and the push operation simultaneously through the haptic knob so that a compact construction and a more accurate operation can be achieved. In addition, a directional operation through the push switch unit can be implemented so that a simplified structure integrating the operated switches is provided, thereby facilitating the manufacture of the haptic steering wheel switch apparatus and remarkably reducing the manufacturing cost.

Fourth, the haptic steering wheel switch apparatus according to the present invention and the haptic steering wheel switch system including the same can a more simplified and combined switching function through the button switch unit disposed at the outside of the haptic knob.

Fifth, the haptic steering wheel switch apparatus according to the present invention and the haptic steering wheel switch system including the same can allow a driver to make a more rapid visual perception by outputting predetermined light in response to the switching operation through the light source unit disposed in the haptic knob or the button switch unit.

Sixth, the haptic steering wheel switch apparatus according to the present invention and the haptic steering wheel switch system including the same can implement a simplified and combined icon output function through the color filter, thereby achieving a combined function at low manufacturing cost.

Seventh, the haptic steering wheel switch apparatus according to the present invention and the haptic steering wheel switch system including the same allows the haptic wheel device actuator to be securely mounted so that the influence of a moment of inertia is minimized at the time manipulating the switch knob, thus facilitating the manipulation of the haptic knob.

Eighth, the haptic steering wheel switch apparatus according to the present invention and the haptic steering wheel switch system including the same are disposed on the front or rear side of the vehicle steering wheel so that it achieve a thumb-wheel type operation structure using a thumb even in a state in which a driver grips the steering wheel or an operation structure using his or her finger such as an index finger, a middle finger, or the like except the thumb, thereby implementing the driver's smooth operation.

Ninth, the haptic steering wheel switch apparatus according to the present invention and the haptic steering wheel switch system including the same enables predetermined light to be outputted in response to the operation of the haptic knob through the steering wheel light source unit so that visual information can be provided to the driver. Thus, the driver can perceive the switching operation state, the vehicle warning or informing state, or the like, more rapidly and smoothly, and can cope with the emergent problems while driving.

While the present invention has been described in connection with the exemplary embodiments illustrated in the drawings, it is merely illustrative and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should be defined by the technical spirit of the appended claims.

What is claimed is:

1. A haptic steering wheel switch apparatus comprising:
a haptic wheel housing unit configured to be disposed on a vehicle steering wheel;
a circuit board unit configured to be disposed inside the haptic wheel housing unit;
a haptic wheel device including a haptic wheel device actuator configured to establish an electrical connection with the circuit board unit and including a haptic shaft, a haptic knob connected with the haptic shaft and exposedly disposed in the haptic wheel housing unit, and a haptic wheel device sensing unit configured to detect the rotating state of the haptic shaft, the haptic knob being movable in a vertical direction that is perpendicular to a plane on which the vehicle steering wheel is arranged;
a push switch disposed on the circuit board unit; and
a push switch operating part provided on an outer circumference of the haptic wheel device actuator,
wherein, according to a movement of the haptic knob in said vertical direction, the haptic wheel device actuator moves in said vertical direction, and the push switch operating part moves along with the haptic wheel device actuator in said vertical direction and presses the push switch.

2. The haptic steering wheel switch apparatus according to claim 1, wherein the haptic knob achieves a rotary operation on said plane on which the vehicle steering wheel is arranged.

3. The haptic steering wheel switch apparatus according to claim 2, wherein the haptic knob is disposed on a front side of the vehicle steering wheel, and a rotation central axis of the haptic shaft intersects said plane.

4. The haptic steering wheel switch apparatus according to claim 3, wherein the haptic shaft of the haptic wheel device actuator includes a first end and a second end respectively formed at both ends thereof.

5. The haptic steering wheel switch apparatus according to claim 4, wherein the haptic knob is connected with the first end of the haptic shaft and the haptic wheel device sensing unit is connected with the second end of the haptic shaft.

6. The haptic steering wheel switch apparatus according to claim 5, wherein a shaft knob holder is disposed between the haptic knob and the first end of the haptic shaft to prevent the relative rotation between the haptic knob and the first end.

7. The haptic steering wheel switch apparatus according to claim 5, wherein a shaft sensing holder is disposed between the haptic wheel device sensing unit and the second end of the haptic shaft to prevent the relative rotation between the haptic wheel device sensing unit and the second end.

8. The haptic steering wheel switch apparatus according to claim 7, wherein the haptic wheel device sensing unit comprises a device sensing body part connected with the haptic wheel device actuator, and a device detecting sensor part configured to detect the rotation state of the device sensing body part,
wherein the device sensing body part comprises:
a device sensing main pulley connected with the shaft sensing holder in such a fashion that the relative rotation between the device sensing main pulley and the shaft sensing holder is restricted;
a device sensing sub-pulley connected with the device sensing main pulley in such a fashion as to be spaced apart from the device sensing main pulley;
a device sensing belt configured to interconnect the device sensing main pulley and the device sensing sub-pulley; and
a device disk connected to the device sensing sub-pulley and configured to be rotated together with the device sensing sub-pulley when the device sensing sub-pulley is rotated, the device slot being rotatably disposed at a position corresponding to the device detecting sensor part.

9. The haptic steering wheel switch apparatus according to claim 8, wherein a rotation ratio of the device sensing main pulley to the device sensing sub-pulley is more than 1.

10. The haptic steering wheel switch apparatus according to claim 3, the push switch pressed by the push switch operating part generates a switching signal.

11. The haptic steering wheel switch apparatus according to claim 10, wherein the haptic wheel device sensing unit is moved vertically together with the haptic wheel device actuator.

12. The haptic steering wheel switch apparatus according to claim 10, wherein the haptic knob is formed of a light-transmitting material, the circuit board unit comprises a knob board configured to allow the first end of the haptic shaft to pass there through and serve as an end of the haptic wheel device actuator, and a haptic knob light source unit is mounted on the knob board to output light.

13. The haptic steering wheel switch apparatus according to claim 3, wherein a button switch unit is disposed at an outside of the haptic knob so that it is operated vertically independently of the haptic knob.

14. The haptic steering wheel switch apparatus according to claim 3, wherein the haptic knob comprises a haptic knob dimple formed in a concave shape on one surface thereof, the haptic knob dimple having a structure in which a dimple depth formed in a direction perpendicular to the rotation center of the haptic knob is gradually decreased as it goes toward a radial direction from the center of the haptic knob.

15. The haptic steering wheel switch apparatus according to claim 3, wherein the haptic knob comprises a haptic knob grip formed protrudingly on one surface thereof.

16. The haptic steering wheel switch apparatus according to claim 3, wherein the haptic knob comprises a haptic knob contact surface formed in a dual injection manner on a top thereof to increase a contact frictional force between the driver's finger and the haptic knob.

17. The haptic steering wheel switch apparatus according to claim 1, wherein the push switch is provided in plural numbers.

18. The haptic steering wheel switch apparatus according to claim 1, further comprising a steering wheel light source unit disposed in the haptic wheel housing unit and configured to establish an electrical connection with the circuit board unit so as to output predetermined light in response to the operation of the haptic knob.

19. The haptic steering wheel switch apparatus according to claim 18, further comprising a wheel rim light source output unit disposed in a wheel rim of the vehicle steering wheel and configured to receive light entering from the steering wheel light source unit and output the received light to the outside.

20. The haptic steering wheel switch apparatus according to claim 1, further comprising a steering wheel light source unit disposed in the haptic wheel housing unit and configured to establish an electrical connection with the circuit board unit so as to output predetermined light in response to an electrical signal applied from an external vehicle control device.

21. The haptic steering wheel switch apparatus according to claim 1, wherein the push switch includes two push switches that are disposed diagonally relative to a central axis of the haptic wheel device actuator.

22. The haptic steering wheel switch apparatus according to claim 1, wherein the push switch operating part has a shape of a ring that surrounds the entire outer circumference of the haptic wheel device actuator.

23. A haptic steering wheel switch apparatus comprising:
a haptic wheel housing unit configured to be disposed on a vehicle steering wheel;
a circuit board unit configured to be disposed inside the haptic wheel housing unit; and
a haptic wheel device including a haptic wheel device actuator configured to establish an electrical connection with the circuit board unit and including a haptic shaft, a haptic knob connected with the haptic shaft and exposedly disposed in the haptic wheel housing unit, and a haptic wheel device sensing unit configured to detect the rotating state of the haptic shaft,
wherein the haptic knob achieves a rotary operation on a plane on which the vehicle steering wheel is arranged and the haptic wheel device actuator is moved vertically in a longitudinal direction of the haptic shaft,
wherein the haptic knob is disposed on a front side of the vehicle steering wheel, and a rotation central axis of the haptic shaft intersects said plane,
wherein a button switch unit is disposed at an outside of the haptic knob so that it is operated vertically independently of the haptic knob, and
wherein the button switch unit comprises:
a button knob configured to be disposed on the outside of the haptic knob in such a fashion as to be exposed at one surface thereof to the outside of the haptic wheel housing unit;
a button guide configured to be disposed at one end thereof within the button knob and disposed at the other end thereof within the haptic wheel housing unit toward the circuit board unit;
a button guide holder configured to be attached to the button guide and disposed in the haptic wheel housing unit in a vertically stable movable manner together with the button guide; and
a button switch configured to be disposed on one surface of the circuit board unit in such a fashion as to be brought into close contact with the button guide holder.

24. The haptic steering wheel switch apparatus according to claim 23, wherein the button guide holder comprises a button guide holder stopper formed on one side thereof, and the haptic wheel housing unit comprises a wheel housing body stopper formed thereon in such a fashion as to come into close contact with the button guide holder stopper to correspond to the button guide holder stopper so that the button guide holder is prevented from being separated and escaping from the wheel housing body of the haptic wheel housing unit.

25. The haptic steering wheel switch apparatus according to claim 23, wherein the button guide holder comprises a button guide holder operating part configured to operate the button switch.

26. The haptic steering wheel switch apparatus according to claim 23, wherein the button switch unit further comprises a button light source unit, and the button guide is formed of a light guide material.

27. The haptic steering wheel switch apparatus according to claim 26, wherein the button guide holder operating part comprises a button guide holder operating part seating face formed on one surface thereof so that it comes in close contact with the button guide to support the button guide.

28. The haptic steering wheel switch apparatus according to claim 26, wherein a button color filter is disposed between the button guide and the button knob to transmit only light having a predetermined frequency band.

29. A haptic steering wheel switch system comprising:
a haptic steering wheel switch apparatus which comprises:
a haptic wheel housing unit configured to be disposed on a vehicle steering wheel;
a circuit board unit configured to be disposed inside the haptic wheel housing unit;
a haptic wheel device including a haptic wheel device actuator configured to establish an electrical connection with the circuit board unit and including a haptic shaft, a haptic knob connected with the haptic shaft and exposedly disposed in the haptic wheel housing unit, and a haptic wheel device sensing unit configured to detect the rotating state of the haptic shaft, the haptic knob being movable in a vertical direction that is perpendicular to a plane on which the vehicle steering wheel is arranged;

a push switch disposed on the circuit board unit; and a push switch operating part provided on an outer circumference of the haptic wheel device actuator, wherein, according to a movement of the haptic knob in said vertical direction, the haptic wheel device actuator moves in said vertical direction, and the push switch operating part moves along with the haptic wheel device actuator in said vertical direction and presses the push switch, a control unit configured to establish an electrical connection with the haptic steering wheel switch apparatus; and a storage unit configured to establish an electrical connection with the control unit and store predetermined data for a predetermined operating mode.

* * * * *